US00RE43788E

(19) United States
(12) Reissued Patent
Abramovitch et al.

(10) Patent Number: US RE43,788 E
(45) Date of Reissued Patent: Nov. 6, 2012

(54) RE-WRITABLE OPTICAL DISK HAVING REFERENCE CLOCK INFORMATION PERMANENTLY FORMED ON THE DISK

(75) Inventors: Daniel Y. Abramovitch, Palo Alto, CA (US); David K. Towner, Boise, ID (US)

(73) Assignee: Hewlett-Packard Development Company, L.P., Houston, TX (US)

(21) Appl. No.: 12/725,099

(22) Filed: Mar. 16, 2010

(65) Prior Publication Data

US 2010/0182893 A1 Jul. 22, 2010

Related U.S. Patent Documents

Reissue of:
(64) Patent No.: 6,046,968
Issued: Apr. 4, 2000
Appl. No.: 08/899,427
Filed: Jul. 24, 1997

U.S. Applications:
(62) Division of application No. 09/997,036, filed on Nov. 27, 2001, now Pat. No. Re. 41,881.

(51) Int. Cl.
*G11B 7/00* (2006.01)
(52) U.S. Cl. ..... 369/47.28; 369/59.2
(58) Field of Classification Search ..... 369/275.4, 369/275.3, 47.22, 47.27, 47.28, 47.19, 47.47, 369/47.48, 59.25, 44.13, 44.26, 59.2
See application file for complete search history.

(56) References Cited

U.S. PATENT DOCUMENTS

| | | | |
|---|---|---|---|
| 3,891,794 | A | 6/1975 | Russell |
| 3,963,862 | A | 6/1976 | Bouwhuis |
| 4,238,843 | A | 12/1980 | Carasso et al. |
| 4,363,116 | A | 12/1982 | Kleuters et al. |
| 4,366,564 | A | 12/1982 | De Haan et al. |

(Continued)

FOREIGN PATENT DOCUMENTS

EP 0825591 A2 2/1998

(Continued)

OTHER PUBLICATIONS

Borg et al., "High Density Phase-Change Recording Beyond 2.6 GByte," Proceedings of SPIE, vol. 3109, pp. 20-25, Conference held Apr. 1997.

*Primary Examiner* — Thang Tran

(57) ABSTRACT

An optical disk structure and optical disk recorder which enables data to be re-written onto the recording layer of the optical disk. A clock reference structure is permanently formed along servo tracks of the optical disk. An optical transducer is coupled to the clock reference structure and generates a clock reference signal simultaneously with writing new data onto the recording layer of the optical disk. The data is written as data marks along the servo tracks. Each of the data marks includes edges. The edges of the data marks are recorded in synchronization with a write clock. The write clock is phase-locked with the clock reference signal. Therefore, the edges of the data marks are aligned with the clock reference structure with sub-bit accuracy. Standard DVD-ROM disk readers are not able to detect the high spatial frequency of the clock reference structure. Therefore, the optical disk structure and optical disk recorder of this invention allow production of re-writable optical disks which can be read by standard DVD-ROM disk readers.

30 Claims, 16 Drawing Sheets

U.S. PATENT DOCUMENTS

| | | | | | |
|---|---|---|---|---|---|
| 4,375,088 | A | | 2/1983 | De Haan et al. | |
| 4,464,714 | A | | 8/1984 | Huijser et al. | |
| 4,703,408 | A | | 10/1987 | Yonezawa et al. | |
| 4,716,560 | A | | 12/1987 | Itonage | |
| 4,807,214 | A | * | 2/1989 | Getreuer | 369/275.4 |
| 4,907,216 | A | | 3/1990 | Rijnsburger | |
| 4,972,401 | A | | 11/1990 | Carasso et al. | |
| 5,023,856 | A | | 6/1991 | Raaymakers et al. | |
| 5,148,422 | A | | 9/1992 | Sako et al. | |
| 5,182,741 | A | | 1/1993 | Maeda et al. | |
| 5,303,216 | A | | 4/1994 | Shinoda et al. | |
| 5,311,491 | A | | 5/1994 | Yamagami et al. | |
| 5,315,571 | A | | 5/1994 | Maeda et al. | |
| 5,339,301 | A | | 8/1994 | Raaymakers et al. | |
| 5,418,764 | A | | 5/1995 | Roth et al. | |
| 5,508,985 | A | | 4/1996 | Fairchild et al. | |
| 5,587,901 | A | | 12/1996 | Yamagami et al. | |
| 5,682,365 | A | | 10/1997 | Carasso et al. | |
| 5,848,050 | A | * | 12/1998 | Nagasawa et al. | 369/275.4 |
| 5,978,333 | A | | 11/1999 | Kobayashi et al. | |
| 6,046,968 | A | * | 4/2000 | Abramovitch et al. | 369/47.28 |
| 7,701,836 | B2 | | 4/2010 | Abramovitch et al. | |
| RE41,881 | E | | 10/2010 | Abramovitch et al. | |

FOREIGN PATENT DOCUMENTS

| | | | |
|---|---|---|---|
| EP | 0825591 | A3 | 8/1998 |
| GB | 2 087 628 | | 11/1981 |
| GB | 2 087 628 | A | 11/1981 |
| JP | 60-74123 | | 9/1983 |
| JP | 4-325924 | | 4/1991 |
| JP | 8-306068 | | 5/1995 |

* cited by examiner

RE-WRITABLE OPTICAL DISK HAVING REFERENCE CLOCK INFORMATION PERMANENTLY FORMED ON THE DISK

Matter enclosed in heavy brackets [ ] appears in the original patent but forms no part of this reissue specification; matter printed in italics indicates the additions made by reissue.

*CROSS REFERENCE TO RELATED APPLICATIONS*

*This application is a divisional reissue application of U.S. application Ser. No. 09/997,036, now U.S. Pat. RE41,881, filed on Nov. 27, 2001 and entitled "Re-Writable Optical Disk Having Reference Clock Information Permanently Formed on the Disk," which is a reissue of U.S. Pat. No. 6,046,968 entitled "Re-Writable Optical Disk Having Reference Clock Information Permanently Formed on the Disk," which issued from application Ser. No. 08/899,427 filed Jul. 24, 1997.*

FIELD OF INVENTION

This invention relates generally to storing data on re-writable optical disks. In particular, it relates to an optical disk having servo tracks including a clock reference structure for generating a clock reference signal for accurately controlling the placement of data marks along the servo tracks when writing information to a recording layer of the optical disk, and an optical disk recorder for writing the information to the optical disk.

BACKGROUND

Typically, data is stored on a recording layer of an optical disk by forming either data pits or data marks on the recording layer of the disk. The data pits or marks are formed along servo tracks on the recording layer of the optical disk. A servo track is a permanent physical feature on the recording layer of the optical disk which provides a track-following reference and defines the path along which stat is written. Servo tracks may be spiral or concentric. A groove is an example of a servo track. In some types of prerecorded optical disks, such as read only memory (ROM) disks, the data pits formed on the recording layer also function as a servo track.

Typically, an optical transducer which includes a focused laser beam is coupled to a servo track on the recording layer of the optical disk. When reading the optical disk, the data pits or marks formed along the servo track pass by the optical transducer as the optical disk rotates, causing the optical transducer to generate a data signal representing the data stored on the recording layer of the disk. The optical transducer includes a focus positioner and a tracking positioner for maintaining alignment of the focused laser beam with respect to the servo track in the focus direction and the cross-track direction as the optical disk rotates. The focus and tracking positioners include servo-control systems which respond to focus and tracking error signals produced by the optical transducer.

FIGS. 1a, 1b, 1c show a typical mass-produced optical ROM disk in which prerecorded data is stored on an optical disk 10 by forming a predetermined series of data pits 12 along a track 14 of the optical disk 10. FIG. 1a shows a top-view of the optical disk 10. FIG. 1b shows an expanded view of the track 14 shown in FIG. 1a. FIG. 1c shows a cross-sectional view of the track 14 shown in FIG. 1b. The recording layer of the optical disk 10 is permanently formed during manufacturing to create the data pits 12. Therefore, data on an optical disk 10 which is stored by forming data pits 12 on the recording layer of the optical disk 10 can not be erased or re-written.

In a re-writable optical disk, such as a phase change optical disk, data is stored on the recording layer of the optical disk in the form of data marks by controlling the optical characteristics of the recording layer of the disk. Data marks are formed on the recording layer by heating the recording layer of the disk with a focused laser beam at the locations where the data marks are to be written. In phase change recording, the optical reflectivity of the data mark is determined by the crystalline condition of the recording layer. The crystalline condition of the recording layer is determined by controlling the optical power in the focused laser beam. The optical power of the laser beam used to heat the recording layer determines the rate at which the temperature of the recording layer of the optical disk cools where the data mark is located. The rate at which the data mark location of the recording layer cools determines whether the location cools to an amorphous or a crystalline condition. Typically, the recorded data mark is amorphous and the surrounding area is crystalline.

FIGS. 2a, 2b, 2c show a re-writable optical disk 20 in which data is stored on the optical disk 20 by forming a series of data marks 22 along a track 24 of the optical disk 20. FIG. 20a shows a plan-view of the optical disk 20. FIG. 2b shows an expanded view of the track 24 shown in FIG. 2a. FIG. 2c shows a cross-sectional view of the track 24 shown in FIG. 2b.

In the prior art, placement of data to be written on a recording layer of a re-writable optical disk is typically determined by including synchronization information between fixed-length data fields. A sector is a repeating unit of pre-determined length. FIG. 3a shows a plan-view of a prior art optical disk 30 in which data stored along a servo track 32 is divided into sectors 34. FIG. 3b shows an expanded view of a sector 34 of the optical disk shown in FIG. 3a. The sector 34 includes a header 36, a data field 38 having a predetermined length, and an edit gap 40. FIG. 3c shows an expanded view of the header 36 shown in FIG. 3b. The header 36 includes synchronization information 42 and track address information 44. The synchronization information 42 is also referred to as the sync field. The synchronization information 42 is permanently encoded on the recording layer of the optical disk 30 within the sectors 34. Data written onto the recording layer of the optical disk 30 is synchronized to a write clock. The write clock is synchronized to a clock reference signal which is generated periodically as the synchronization information 42 passes by the optical transducer as the optical disk 30 rotates. The clock reference signal provides position information of the optical transducer with respect to synchronization information 42 on the recording layer of the optical disk 30 when the synchronization information 42 passes by the optical transducer. However, while data within data fields 38 is being written by the optical transducer, the clock reference signal drifts in frequency and phase. That is, when the optical transducer is between points where synchronization information 42 exists, the frequency and phase of the write clock can drift with respect to the synchronization information 42 located within sectors 34. Drift of the write clock with respect to the synchronization information 42 can be caused by disk rotation speed variations, servo track eccentricity and the cumulative effect of other variations in an optical disk recorder such as clock frequency drift. In general, the greater the distance between sync fields, the greater the drift of the write clock.

The edit gap 40 shown in FIG. 3b is included within the sector 34. A data field which includes a fixed number of data bits is typically written to the sector 34 of the recording layer of the optical disk 30. The edit gap 40 accommodates variations in the placement of the last data bit of a data field which is written to the sector 34. That is, although all data fields normally contain the same number of data bits, the edit gap 40 allows the placement of the last data bit of a data field to be different each time the data field is re-written. Therefore, placement of bits written to the recording layer is not required to be as precise as the placement would be required to be if the edit gap 40 did not exist. Edit gaps are needed to accommodate drift of the write clock in prior art re-writable optical disks.

Presently existing DVD read only memory (ROM) formats do not include physical sectoring of data stored on the recording layer of an optical disk. Therefore, synchronization fields and edit gaps are not provided. When reading a ROM optical disk, a read clock is produced from the data stored on the optical disk. Therefore, no synchronization information is required.

The DVD read only memory (ROM) format specification organizes data into fixed-length data fields for error correction code (ECC) purposes. Each data field has an associated header containing synchronization and address information to facilitate data readout. This synchronization and address information is stored on the disk in the form of data pits which are indistinguishable from the data pits used to encode data. Although a DVD-ROM data field, together with its associated header information makes up a "physical sector" for the purposes of a read-only memory, it does not satisfy the requirements of a physical sector for the purposes of a re-writable optical disk memory. For this reason, all sectoring of the DVD format is treated as "logical sectoring." A logical sector is contained within the data, whereas a physical sector contains the data. Therefore, all synchronization information, addressing and other DVD formatting are treated as if they were data, and are written on the disk in the form of data marks at the same time data is written.

Writing data to the recording layer of a re-writable optical disk which is compatible with DVD-ROM formats therefore requires the data to be written to a disk having no physical sectors on the unwritten disk, and therefore, no address or synchronization information in dedicated areas within the physical sectors. Furthermore, edit gaps can not be included. Without edit gaps, the data marks must be written with sub-bit accuracy during overwriting of pre-existing data.

U.S. Pat. Nos. 4,238,843, 4,363,116, 4,366,564, 4,375,088, 4,972,401 teach methods of permanently providing additional synchronization information along the tracks of an optical disk within data fields. The teachings of these patents also include synchronization information within sync fields between the data fields. Further, the spatial frequency of the synchronization information which is within the data fields must correspond with nulls in the spatial frequency of the data. This requires the data to be encoded using special codes so that nulls in the spatial frequency of the data correspond with the spatial frequency of the synchronization information.

It is desirable to have a re-writable optical disk and an optical disk recorder capable of recording data on the optical disk wherein the recorded disk is compatible with DVD-ROM standard formats, and is readable by a standard DVD reader, and wherein pre-existing data on the optical disk can be re-written (sometimes called over-written) with new data with sub-bit accuracy. The optical disk and optical disk recorder must be capable of generating a write clock which is synchronized with sub-bit accuracy to absolute position along the servo tracks of the optical disk. Further, it is necessary to be able to write standard DVD data formats.

The present invention provides a re-writable optical disk having a recording layer which includes a permanent clock reference structure provides a clock reference signal generated by an optical transducer as the clock reference structure passes by the optical transducer as the optical disk rotates. A write clock is phase-locked to the clock reference signal. The write clock enables new data to be written to the recording layer of the optical disk with sub-bit accuracy. Further, the write clock eliminates the need for sync fields and edit gaps and provides a means for writing and re-writing data in data fields of indeterminate length.

A first embodiment of the invention includes an optical disk. The optical disk includes a recording layer having servo tracks. A clock reference structure is formed along the servo tracks. The clock reference structure permits data to be written to the recording layer in data fields of indeterminate length. The clock reference structure comprises a reference spatial frequency which is greater than a predetermined spatial frequency. An extension of this embodiment includes the predetermined spatial frequency being greater than the maximum spatial frequency detectable by a standard DVD-ROM reader.

Another embodiment of the invention includes an optical disk recorder in which an optical disk is rotatably mounted on the recorder. The optical disk includes a recording layer containing servo tracks. An optical transducer radially follows a servo track as the optical disk rotates. A clock reference structure pre-exists along the servo tracks and provides data fields of indeterminate length. The clock reference structure causes the optical transducer to produce a clock reference signal as the optical disk rotates. The optical disk recorder further includes a means for recording data marks on the recording layer of the optical disk. The data marks are recorded so that a standard DVD-ROM reader can read the data marks but the optical disk is constructed so that the reader cannot detect the clock reference structure. A write clock determines the physical placement of data marks written on the recording layer of the optical disk. The write clock is phase locked to the clock reference signal.

Another embodiment of the invention includes an optical disk recorder for receiving an optical disk. The optical disk is rotatably mountable on the recorder. The optical disk includes a recording layer having servo tracks and a clock reference structure having a spatial frequency which is too high to be detected by a standard DVD-ROM reader. The clock reference structure is formed along the servo tracks and provides data fields of indeterminate length. The optical disk recorder includes an optical transducer which is optically coupled to the recording layer of the optical disk. The optical transducer follows the servo tracks of the optical disk as the optical disk rotates. The clock reference structure formed along the servo tracks of the optical disk causes the optical transducer further includes a means for writing data marks on the recording layer of the optical disk. A write clock determines the physical placement of data marks written on the recording layer of the optical disk. The write clock is phase locked to the clock reference signal.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1b shows an expanded view of a track shown in FIG. 1a.

FIG. 2b shows an expanded view of a track shown in FIG. 2a.

FIG. 3b shows an expanded view of a sector 34 of the optical disk shown in FIG. 3a.

FIG. 7 shows a cross-sectional view of the servo tracks of the optical disk shown in FIG. 6a.

FIG. 9b shows a clock reference signal produced by the clock reference structure of FIG. 9a.

DETAILED DESCRIPTION

Figure 1A:
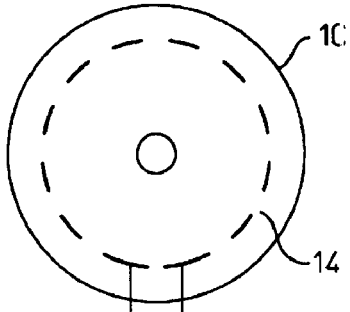
Figure 1a (PRIOR ART)
FIG. 1a shows a plan-view of a prior art ROM optical disk.
Figure 1B:
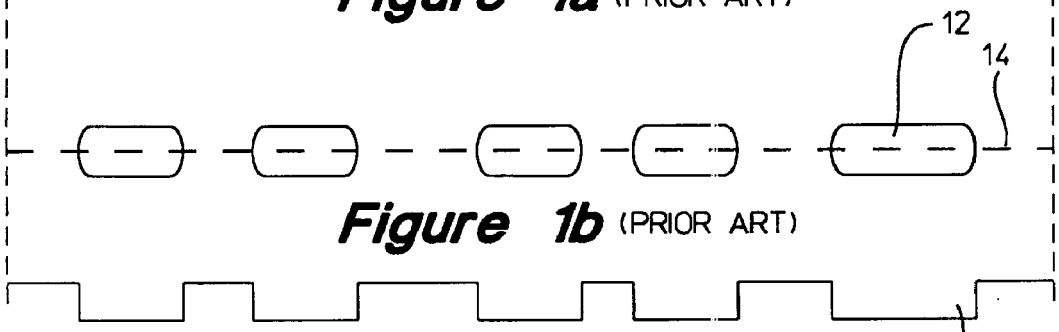
Figure 1b (PRIOR ART)
Figure 1C:
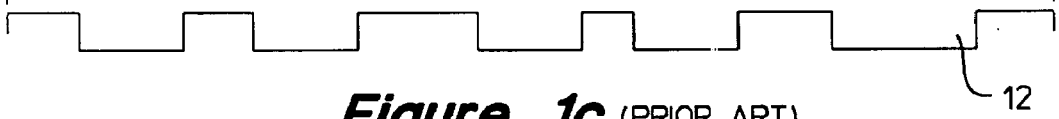
Figure 1c (PRIOR ART)
FIG. 1c shows a cross-sectional view of the track shown in FIG. 1b.

As shown in the drawings for purposes of illustration, the invention is embodied in an optical disk structure and optical disk recorder which enables data to be written or re-written onto the recording layer of the optical disk. The data can be written or re-written with sub-bit accuracy without requiring the unwritten optical disk to be divided into physical sectors. Furthermore, synchronization fields and edit gaps are not required on an optical disk on which data is to be written. The optical disk recorder includes an optical transducer which can resolve and detect a high spatial frequency clock reference structure located on the optical disk. Standard DVD-ROM disk readers are not able to resolve and detect the clock reference structure. Therefore, the optical disk structure and optical disk recorder of this invention allow production of re-writable optical disks which can be read by standard DVD-ROM disk readers. Additionally, the optical disk recorder can read optical disks.

A clock reference structure is permanently formed along servo tracks of the optical disk. An optical transducer is coupled to the clock reference structure and generates a clock reference signal simultaneously with writing new data onto the recording layer of the optical disk. The data is written as data marks along the servo tracks. Each of the data marks includes a first and a second edge. During recording, the edges of the data marks are formed in synchronization with a write clock. Therefore, each time the edge of a data mark is formed, the write clock has completed the same fraction of a cycle. The write clock is phase-locked to the clock reference signal. Therefore, the edges of the data marks are formed in synchronization with the clock reference signal with sub-bit accuracy. Therefore, the edges of the data marks are accurately aligned with the clock reference structure. The edge of the data mark is only recorded when required by the data written and the data encoding scheme. Many cycles of the clock reference structure will not have a corresponding data mark edge.

Figure 4A:
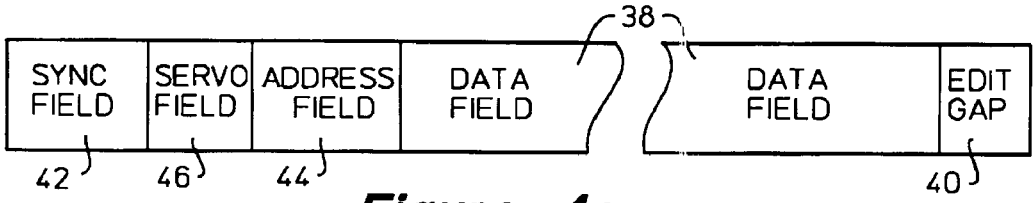
Figure 4a (PRIOR ART)
FIGS. 4a, 4b, 4c shows the components of various types of sectors on an optical disk.
Figure 4B:
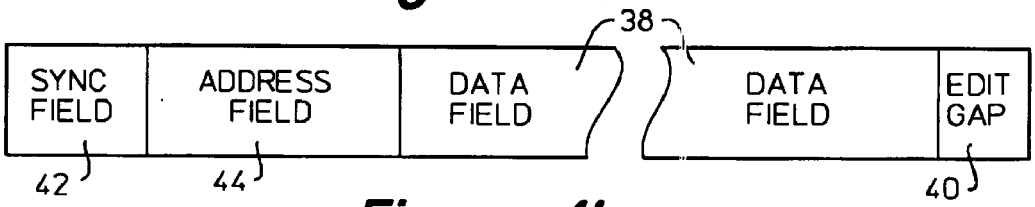
Figure 4b (PRIOR ART)
Figure 4C:
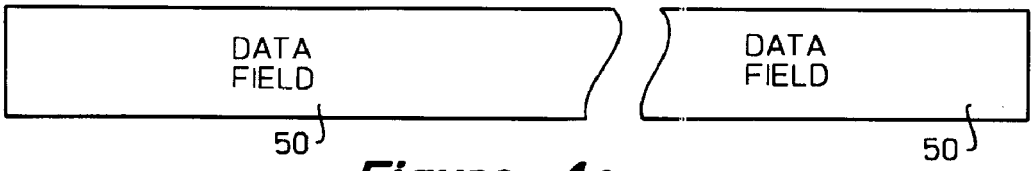
Figure 4c (PRIOR ART)

FIGS. 4a, 4b, 4c illustrate a comparison of the fields of information along the tracks of two prior art optical disks, and the data fields of the present invention. FIG. 4a shows a prior art sector which includes a sync field 42, a servo field 46, an address field 44, a data field 38 and an edit gap 40. FIG. 4b shows a prior art sector which includes a sync field 42, an address field 44, a data field 38 and an edit gap 40. FIG. 4c shows a data field 50 of the invention. The present invention does not require a sync field, an address field, a servo field or an edit gap. Furthermore, the data field 50 of the invention is arbitrary in length. The clock reference structure provides synchronization information which is precise enough to allow elimination of edit gaps. The track address information is included within the clock reference structure.

As shown is FIG. 4c, the data fields of the invention are indeterminate in length. A data field of indeterminate length is a data field in which the data field length and corresponding data capacity are not determined by any permanent structure formed on the optical disk. Therefore, the lengths of data blocks can be determined solely by the requirements of the format and the code used to record the data. Many data formats, including the DVD format, establish uniform data field lengths and include addresses and synchronization information for use during data read out. This information is recorded as data marks. A data field of indeterminate length can accommodate any pattern of data marks in any code or format, whether it represents synchronization information, address information, data or other information. Any information which can be written as data marks can be written anywhere on the disk. In the case of spiral servo tracks, one data field of indeterminate length can be as large as the entire disk. In the case of circular servo tracks, one data field of indeterminate length can be as large as one entire track.

Figure 5A:
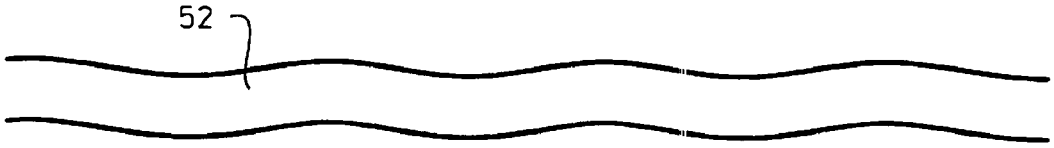
FIG. 5a shows a prior art embodiment of a low frequency reference structure for encoding address information.
Figure 5B:
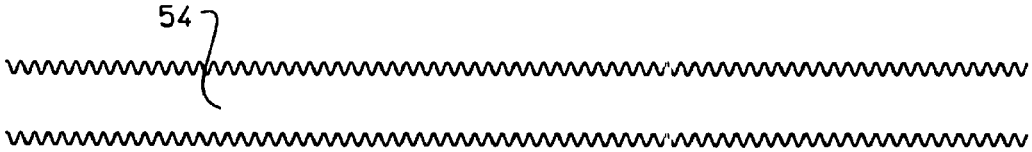
FIG. 5b shows a high frequency clock reference structure.
Figure 5C:
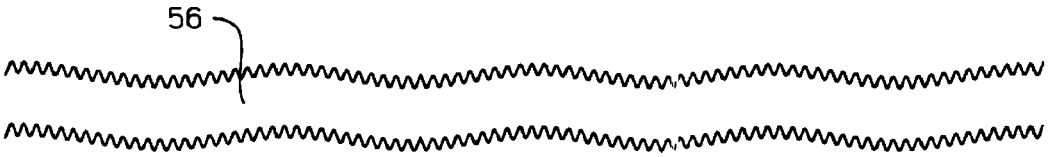
FIG. 5c shows a structure obtained by combining the structures of FIG. 5a and FIG. 5b.

The track address information can be included as a lower spatial frequency modulation superimposed on the higher clock reference structure spatial frequency. FIG. 5a shows a low spatial frequency track address structure 52 which includes track address information. FIG. 5b shows a high spatial frequency clock reference structure 54. FIG. 5c shows the structures of FIG. 5a and FIG. 5b combined. The structure of FIG. 5c provides both a clock reference structure for generating a clock reference signal and a track address structure for generating a track address signal. Alternatively, the track address information can modulate the spatial frequency of the clock reference structure.

A purpose of the present invention includes the elimination of physical sector information from unrecorded optical disks. The term "physical sectors" for the purposes of the description of the invention refers to permanently embossed structures between the data fields shown in FIG. 4a and FIG. 4b. For the invention, synchronization information can be used to synchronize a clock within an optical disk reader to read data within a data field. Such synchronization information is not present before data has been written to the optical disk. Further, such synchronization information is not required by an optical disk recorder of the invention to generate a reference clock signal. The DVD-ROM specification refers to the segmenting of data and the inclusion of synchronization information within the data as "physical sectoring." For the description of the invention, this is referred to as "logical sectoring" to distinguish it from permanently embossed synchronization information located between data fields which is formed during manufacturing of a re-writable optical disk.

Figure 7:
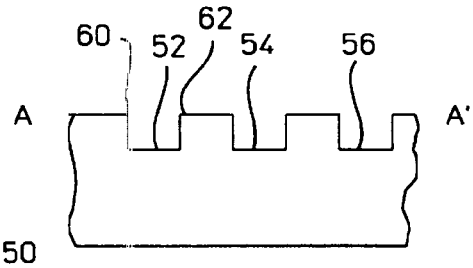
Figure 6A:
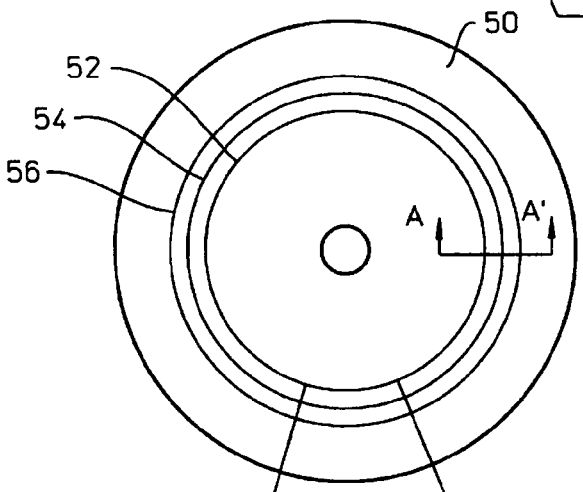
FIG. 6a shows a plan-view of an embodiment of the invention.
Figure 6B:
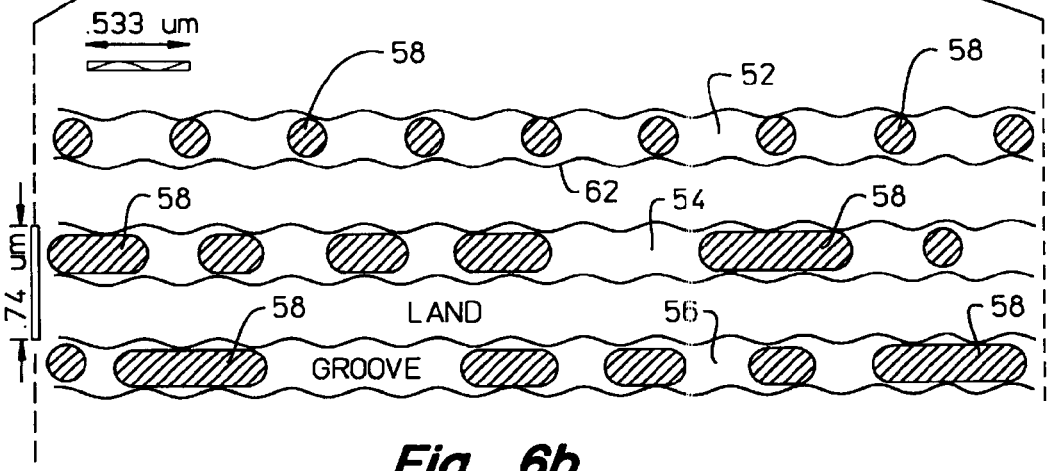
FIG. 6b shows an expanded view of the servo tracks of the optical disk shown in FIG. 6a including data marks.

FIGS. 6a, 6b show an embodiment of the invention. FIG. 6a shows a plan-view of an optical disk 50 of this embodiment. This embodiment includes the optical disk 50 having servo tracks 52, 54, 56. FIG. 6b shows an expanded view of the servo tracks 52, 54, 56 shown in FIG. 6a. Each of the servo tracks 52, 54, 56 includes data marks 58 which are written to a recording layer of the optical disk 50. Each of the servo tracks 52, 54, 56 are shaped as grooves which include a first edge 60 and a second edge 62. FIG. 7 shows a cross-sectional view of the servo tracks 52, 54, 56. The first edge 60 and the second edge 62 are formed to oscillate at a predetermined spatial frequency and phase. For this embodiment, the first edge 60 and the second edge 62 oscillate in-phase. The data marks 58 are formed in the grooves of the servo tracks 52, 54, 56.

Alternate configurations of the embodiment shown in FIGS. 6a, 6b exist. For example, the data marks 58 may be written to the recording layer in the grooves or between the grooves. The data marks 58 may be permanent (write once) or re-writable. The data marks 58 may affect the amplitude, phase or polarization of light emitted from an optical transducer. The servo tracks 52, 54, 56 may be concentric or spiral.

Another embodiment of the invention includes the data marks 58 being formed on the recording layer by heating the recording layer of the optical disk 50 with a focused laser beam at the locations where the data marks 58 are written. In phase-change recording, the optical reflectivity of the data marks 58 is determined by controlling the rate at which the temperature of the recording layer of the optical disk 50 cools where the data marks 58 are located.

The recording layer of an optical disk is characterized by a recording threshold. The recording threshold being the minimum irradiance (optical power per unit area) at the recording layer necessary to alter the recording layer in an optically detectable way; for example by writing data marks. Irradiance levels below the recording threshold do not alter the recording layer and are used for producing the focus and tracking error signals used for maintaining the alignment of the optical transducer with the servo track. Irradiance levels below the recording threshold are also used in an optical disk reader to read recorded data.

As is well known in the art, the optical power emitted by a laser diode can be modulated at very high frequencies by modulating the electrical current used to drive the laser diode. Data recording is accomplished by modulating the laser diode drive current, thereby modulating the optical power emitted by the laser and, consequently, the irradiance at the recording layer. Whenever the irradiance at the recording layer is modulated above the recording threshold the recording layer is altered and a data mark is written. The positions of the edges of data marks along the servo track correspond with the times of read signal transitions when the data marks are read by an optical disk reader.

Methods for manufacturing grooved optical disks are well known in the art and are currently employed in the production of most re-writable optical disks. Typically, a smooth glass disk is coated with photoresist and exposed with a focused laser beam as the disk is rotated on a precision spindle under servo control. For a spiral groove, the focused laser beam is continuously translated in the radial direction as the disk rotates. The exposed disk is developed to remove exposed photoresist and to harden unexposed photoresist; the exposed glass disk is then called the master. The master is then heavily plated with a metal (usually nickel), filling the grooves where the photoresist was exposed by the laser. The metal plating is separated from the master and mounted to a metal backing plate to form a sub-master or stamper. The sub-master is used as one surface of a mold used to manufacture grooved disk substrates. Substrates are normally injection molded from transparent polycarbonate plastic and then coated with the recording layer to form re-writable optical disks. The recording layer is then coated with a protective lacquer film. Laser light used for reading and writing data is focused through the substrate. This arrangement protects the recording layer from damage and contamination.

The edges of the grooves can be formed to oscillate in-phase radially deflecting the laser beam while exposing the photoresist in the mastering process. As is well known in the field of optics, high frequency deflections are practical to implement using a galvanometer mirror, an electro-optic deflector or an acousto-optic deflector in the path of the laser beam between the laser and the objective lens.

The edges of the grooves can be formed to oscillate substantially 180 degrees out-of-phase by modulating the power of the laser beam while exposing the photoresist in the mastering process. Numerous practical methods exist for modulating the power of a laser beam at a high frequency. Some lasers can be modulated directly by controlling a current or voltage source connected to the laser. Otherwise, an electro-optic or acousto-optic modulator, can be used in the laser beam path. A variety of modulation methods are also available that operate within the cavity of a gas laser, as is well known in the field of optics. Other methods of forming grooves can be used including a method which forms a clock reference structure which consists of a groove having a single edge which oscillates.

Figure 8:
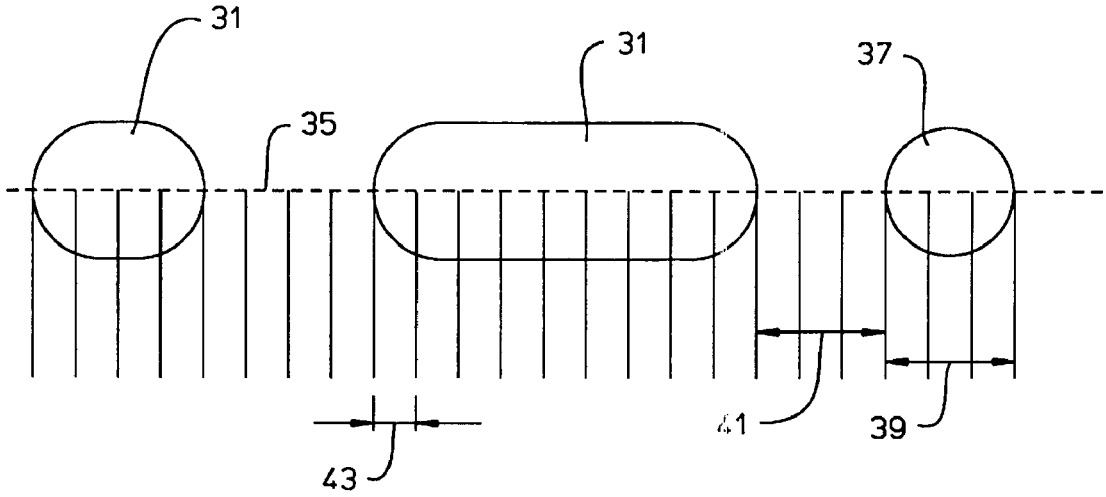
FIG. 8 shows a relationship between the edges of data pits and a channel bit length.

Prior to writing data to an optical disk, the data is encoded. A primary purpose of encoding data is to maximize the data storage capacity of the disk. Using the DVD format as an example, FIG. 8 illustrates some of the elements of a data encoding scheme. Data pits 31 are formed along servo track center line 35. The shortest pit 37 that can be reliably read by a DVD reader has a length 39 equal to 0.40 um. This is dimension is approximately equal to the width of all pits, and the shortest pit 37 is therefore nearly circular. The shortest readable distance 41 between adjacent pits is also 0.40 um. The lengths of pits and the lengths of spaces between pits are required by the code to be integer multiples of a channel bit length 43. The distance between any two pit edges is therefore an integral multiple of the channel bit length. The channel bit length for the DVD code is 0.133 um. The pit lengths and space lengths allowed by the DVD code are 0.400, 0.533, 0.666 . . . 1.866 um. The shortest pit is 3 channel bits long (0.400 um) and the longest pit is 14 channel bits long (1.866 um).

Figure 9A:
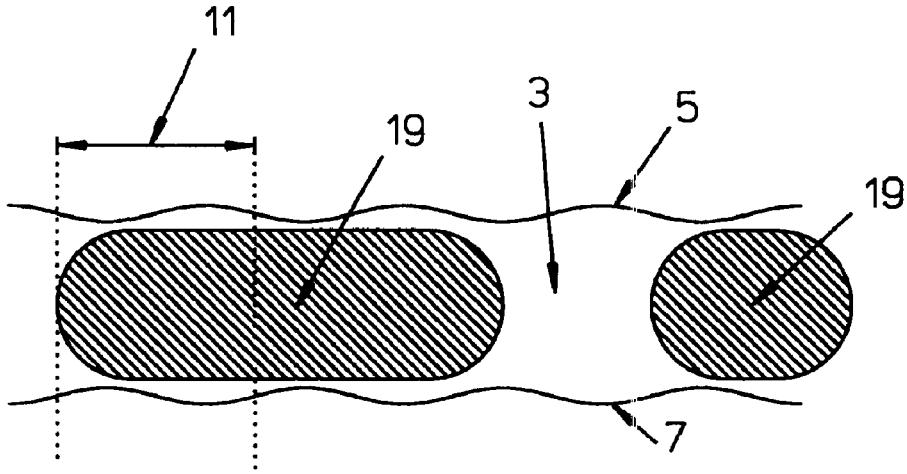
FIG. 9a shows a clock reference structure formed along a servo track.

FIGS. 9a, 9b, 9c, 9d show how a write clock of the invention is produced. A servo track comprises a groove 3 on the recording layer of an optical disk. A clock reference structure comprises groove edges 5 and 7 which oscillate substantially 180 degrees out of phase. As the clock reference structure passes the optical transducer (not shown) of an optical disk recorder (not shown) the optical transducer produces clock reference signal 9 shown in FIG. 9b. As the optical disk rotates, the clock reference structure passes by the optical transducer. In FIG. 9a, an increment of disk motion equal to one spatial period 11 of the clock reference structure causes the clock reference signal 9 of FIG. 9b to pass through one temporal period 13 of modulation. As shown in FIGS. 9a, 9b, 9c, 9d, one spatial period 11 of the clock reference structure has a length equal to four channel bits. One temporal period 13 of modulation of the clock reference signal 9 has a time duration equal to four cycles of the write clock. Thus, one cycle of the write clock corresponds to one channel bit length on the disk For purposes of illustration, the spatial period 11 of the clock reference structure of FIG. 9a is shown at the same drawing scale as a corresponding increment of time. Namely, the temporal period 13 of the clock reference signal shown in FIG. 9b. The ratio of an increment of disk motion to the corresponding increment of time is the linear velocity of the disk.

Figure 9B:
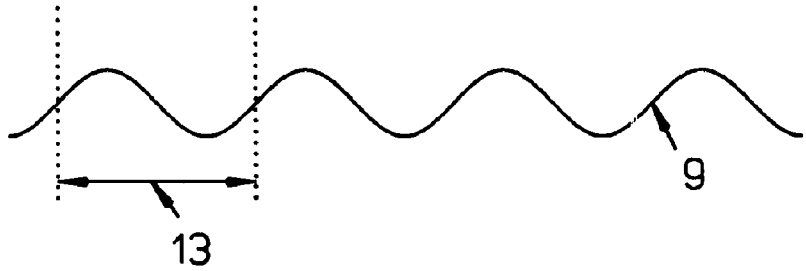
Figure 9C:
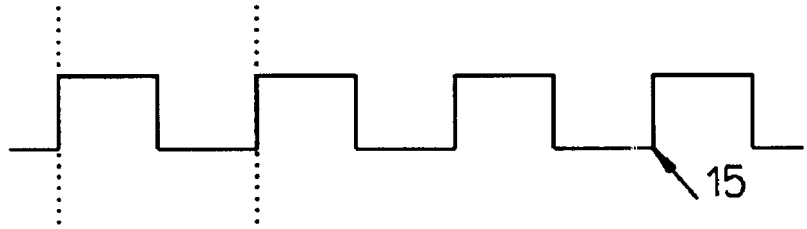
FIG. 9c shows a square wave clock reference signal formed by electronically processing the clock reference signal of FIG. 9b.
Figure 9D:
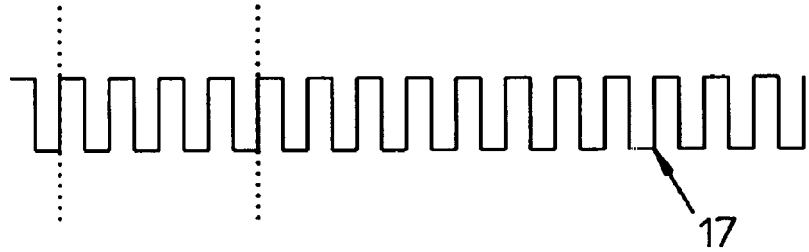
FIG. 9d shows a write clock formed by electronically processing the signal of FIG. 9c.

Clock reference signal shown in FIG. 9b is electronically processed to produce a square wave clock reference signal 15 shown in FIG. 9c. Each cycle of the square wave clock reference signal 15 is electronically divided by four to produce a write clock 17 as shown in FIG. 9d. Write clock 17 is a temporal signal produced at four times the frequency of the clock reference signal and is phase locked to the clock reference signal. Write clock 17 remains phase synchronized with the clock reference signal regardless of the rotational speed of the disk.

In FIG. 9a, edges of data marks 19 are spatially aligned with the clock reference structure and are therefore temporally aligned with the clock reference signal. Data marks 19 which pre-exist on the disk do not affect the process of generating the write clock and will be over-written with new data.

When recording re-writable data on a DVD format disk, a write clock is needed which has a temporal period which corresponds to a channel bit length of 0.133 um. Thus, one channel bit length passes the optical transducer during each period of the write clock. Since a clock reference structure with a spatial period of 0.133 um can not be resolved by currently available optical transducers, the spatial period of the clock reference structure is selected to be a multiple of the channel bit length. In this example, one period of the clock reference structure has a length of four channel bits, equal to 0.533 um. The frequency of the clock reference signal is then ¼ of the channel bit frequency and the clock reference signal is increased in frequency by a factor of four to produce the write clock.

Figure 10:
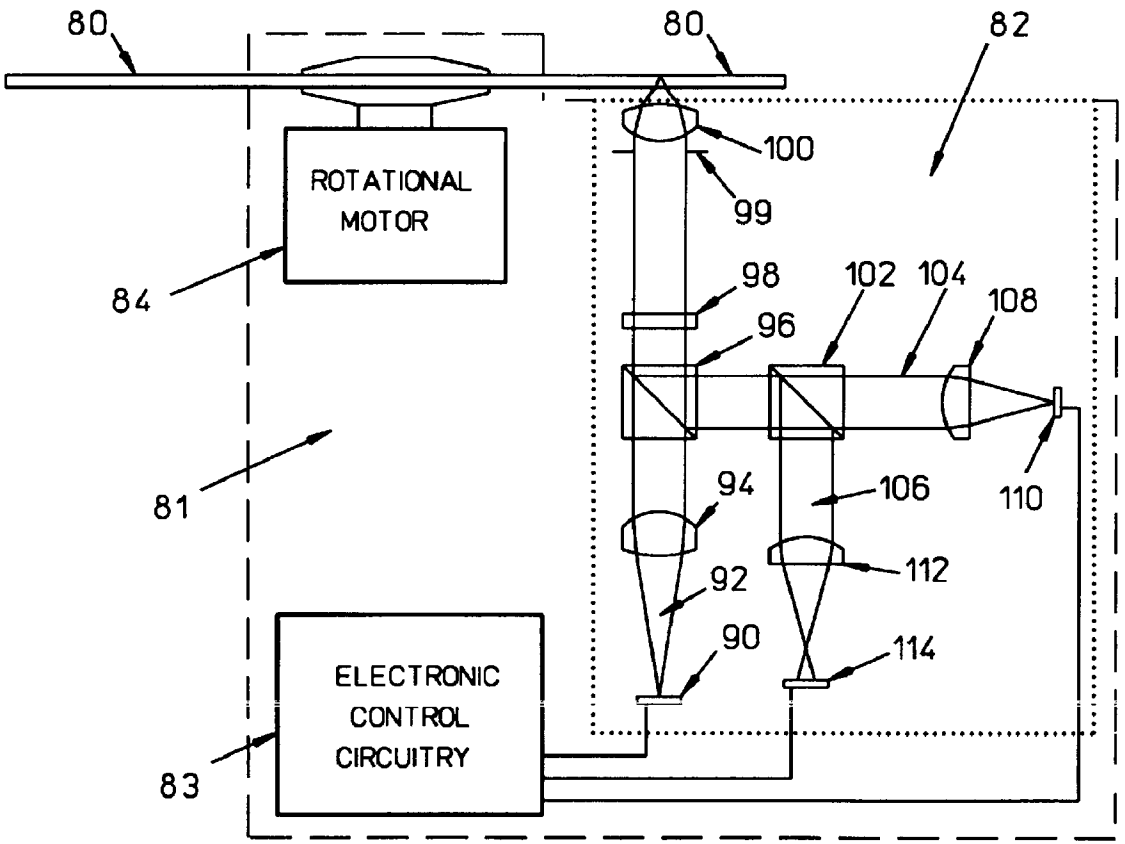
FIG. 10 shows an embodiment of an optical disk and an optical disk recorder in accordance with the invention.

FIG. 10 shows an optical disk 80 and optical disk recorder 81 of this invention. The optical disk recorder 81 receives the optical disk 80. The optical disk recorder 81 includes a rotational motor 84 for rotating the optical disk 80. The optical disk recorder 81 also includes an optical transducer 82 which generates a clock reference signal as a clock reference structure of the optical disk 80 passes by the optical transducer 82 as the optical disk 80 rotates. In one embodiment, the spatial frequency of the clock reference structure is greater than the spatial frequencies detectable by standard DVD-ROM readers. Electronic control circuitry 83 within the optical disk recorder 81 synchronizes a write clock with the clock reference signal generated by the optical transducer 82. A write signal synchronized with the write clock controls when the optical transducer 82 writes edges of data marks to a recording layer of the optical disk 80.

The rotational motor 84 is generally the same as the rotational motors used in prior art optical disk drives.

FIG. 10 shows that the optical transducer 82 of the optical disk recorder 81 includes several optical devices. A laser diode 90 emits a linearly polarized beam of light 92 which is collimated by a collimator lens 94. The light beam 92 is passed through a polarization beam splitter 96. The light beam 92 is converted from linear polarization to circular polarization by a quarter wave retardation plate 98. The light beam 92 then passes through an aperture stop 99 and is focused by an objective lens 100 onto the recording layer of the optical disk 80 whereupon data is recorded. A portion of the light beam 92 is reflected by the optical disk 80 and returns through the objective lens 100 and the quarter wave retardation plate 98. Upon passing back through the quarter wave retardation plate 98, the light beam 92 is again linearly polarized. However, the polarization direction of the light beam 92 is rotated 90 degrees relative to its initial orientation. Therefore, the polarization beam splitter 96 reflects substantially all of light beam 92 towards a beam splitter 102. The beam splitter 102 splits the beam 92 into a first light beam 104 and a second light beam 106. The first light beam 104 is collected by a first lens 108 onto a first detector 110 which is arranged to produce a focus-error signal. The second light beam 106 is collected by a second lens 112 onto a second detector 114 which is arranged to produce a tracking-error signal used by the tracking positioner, and a clock reference signal. Detectors 110 and 114 generally include multiple detection areas and produce multiple signals as is well known in the art. Many alternative arrangements of the optical components and detectors are possible, including arrangements which combine or eliminate optical components shown in FIG. 10.

The optical power emitted by the laser diode 90 can be modulated at very high frequencies by modulating the electrical current used to drive the laser diode 90. Data recording is accomplished by modulating the laser diode 90 drive current, thereby modulating the optical power emitted by the laser diode 90, and consequently, the irradiance at the recording layer of the optical disk 80. The electrical current used to drive the laser diode 90 is controlled by the write signal.

The ability of an optical system to resolve fine structures like the clock reference structure of the invention is described by the modulation transfer function (MTF) of the optical system. Using methods such as Fourier transforms, the spatial distribution of light leaving an object can be represented as a spatial frequency distribution, in which each spatial frequency component has a particular amplitude and phase. A similar approach is commonly used to represent an electrical signal in terms of the component temporal frequencies of the electrical signal. An optical system such a lens, acts as an optical filter which selectively attenuates each spatial frequency component in an image formed by the lens. For each spatial frequency component, the lens has a transfer factor which determines the ratio of image modulation (lens output) to object modulation (lens input). The MTF of the lens specifies the transfer factor as a function of spatial frequency.

Figure 11:
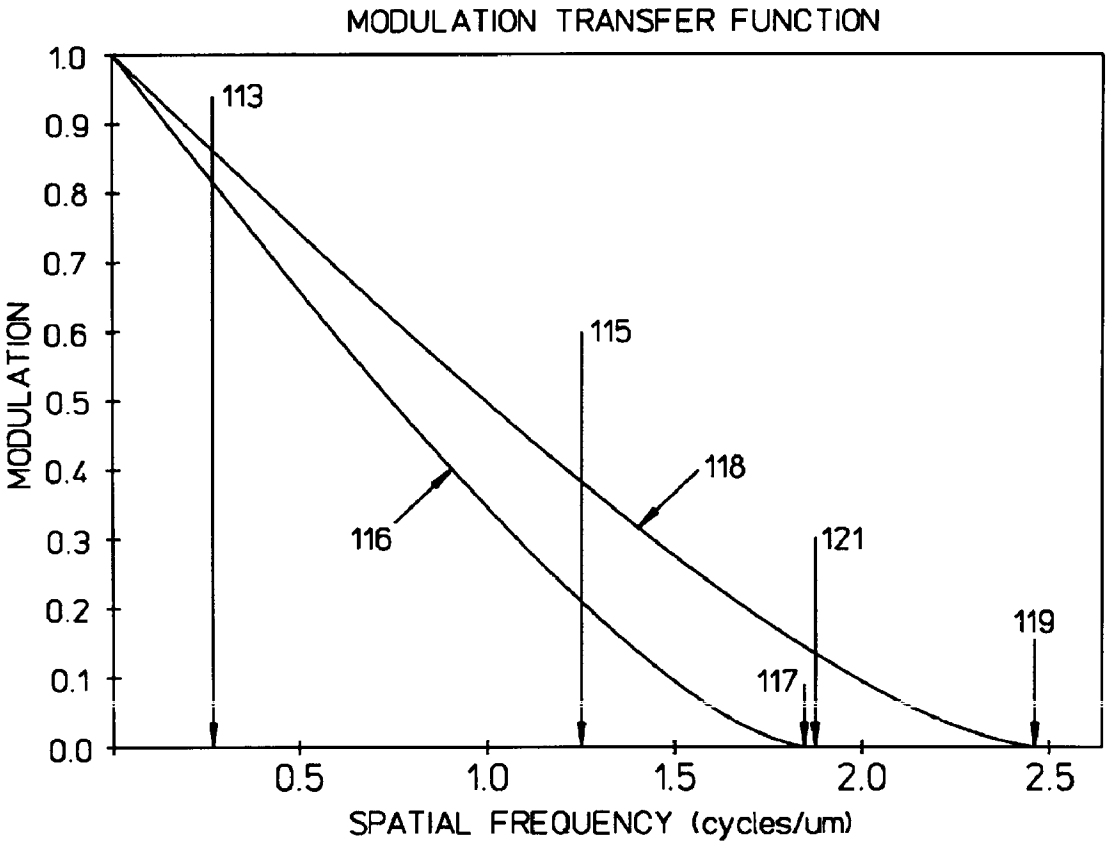
FIG. 11 shows the modulation transfer function (MTF) of an optical transducer of an optical disk recorder constructed in accordance with the invention, and the MTF of a standard DVD optical disk reader.

An aberration-free lens such as the objective lens in the optical transducer of an optical disk recorder or reader, has an MTF which is well known in the art of optics as being the appropriately scaled autocorrelation of the pupil function. FIG. 11 is a graph of the MTF for two aberration-free optical transducers having uniformly filled circular pupils. The functional form of the MFT is similar for all aberration-free optical transducers. However, the spatial frequency at which the MTF goes to zero, known as the cutoff frequency, depends on the numerical aperture (NA) of the objective lens and the wavelength ($\lambda$) of the light forming the image. The cutoff frequency is determined by $2*NA/\lambda$, and is the highest spatial frequency that can be detected by the transducer. Any spatial frequency component higher than the cutoff frequency will not exist in the output of the optical transducer. In an optical disk reader or recorder, the cutoff frequency is determined by the wavelength of the light source and the numerical aperture of the objective lens used to focus a light beam onto the recording layer of an optical disk. Curve 116 of FIG. 11 illustrates the MTF of an optical transducer having a numerical aperture of 0.60 and an operating wavelength of 650 nm. The cutoff frequency 117 for this optical transducer is 1.85 cycles/um.

Manufacturers of optical disks and optical readers develop and agree to optical data storage industry standards. These standards ensure that any optical disk can be read by any optical disk reader if the optical disk and the reader conform to the same industry standards. DVD is an example of an industry standard. The specifications for DVD define numerous parameters of both DVD disks and DVD readers. The specifications include certain parameters of the optical transducer in the optical disk reader. These parameters include the wavelength (650 nm) and the numerical aperture (0.60) of the light beam focused on the optical disk. Curve 116 represents the MTF for the optical transducer of an industry standard DVD optical disk reader. As illustrated by curve 116, and as calculated above, the cutoff frequency for an industry standard DVD reader is 1.85 cycles/um.

The DVD standard only applies to read-only-memory (ROM). The DVD standard does not specify the design and manufacture of re-writable optical disks that can be read by industry standard DVD optical disk readers. There is a market demand for re-writable DVD disks and for optical disk recorders for writing data to the re-writable DVD disks. An object of this invention is to provide a continuous and permanent clock reference structure for use in recording re-writable DVD disks, wherein the clock reference structure can not be detected by industry standard DVD readers.

Curve 118 of FIG. 11 represents the MTF of an optical transducer of an optical disk recorder constructed according to the principles of the present invention. As illustrated by curve 118, the MTF of this optical transducer is greater at all spatial frequencies than the MTF of the optical transducer of an industry DVD optical disk reader as illustrated by curve 116. In addition, cutoff frequency 119 for the optical disk recorder (2.46 cycles/um) is greater than the cutoff frequency 117 of an industry standard DVD reader (1.85 cycles/um).

Curve 118 represents the MTF of an optical transducer having a numerical aperture of 0.8 and a light beam wavelength of 650 nm. However, curve 118 can alternatively represent the MTF of an optical transducer in which the numerical aperture is 0.6 and the light beam wavelength is 488 nm. In either of these example cases, the cutoff frequency 119 is 2.46 cycles/um and the shape of the MTF curve is as represented by the curve 118.

Figure 12:
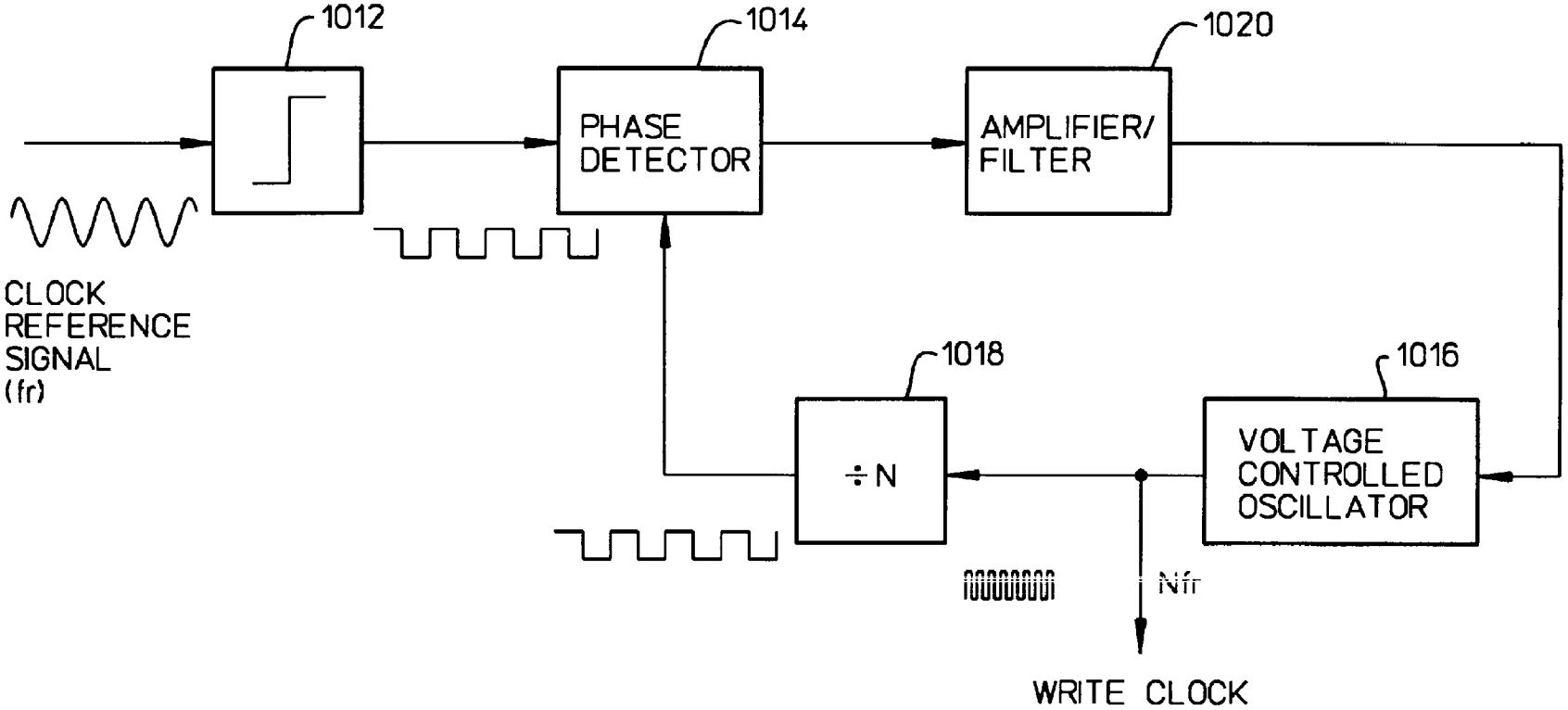
FIG. 12 shows an embodiment of the electronic control circuitry used to generate the write clock from the clock reference signal.

FIG. 11 also shows the clock reference structure spatial frequency 121 of 1.875 cycles/um. The spatial frequency of the clock reference structure is too high for a DVD reader to detect. That is, the spatial frequency of the clock reference structure is higher than the 1.85 cycles/um cutoff frequency of an industry standard DVD reader. However, the MTF of the optical transducer of the disk recorder constructed according to the principles of the present invention has a cutoff frequency 119 which is greater than the spatial frequency of the clock reference structure. Therefore, the disk recorder can detect the clock reference structure and the DVD reader cannot. The numerical values presented here are by way of example. The principles are the same for optical disk readers which have a higher or a lower cutoff frequency. FIG. 12 shows an embodiment of the electronic control circuitry 83 which synchronizes the clock reference signal with the write clock. The write signal which is synchronized with the write clock controls when the optical transducer 82 writes first and second transition edges of the data marks to the surface of the optical disk 80. Generally, the write clock functions at a frequency which is greater than the frequency of the clock reference signal recovered from the optical disk 80 by the optical transducer 82.

The write clock is synchronized to the recovered clock reference signal using a harmonic locking phase-locked loop shown in FIG. 12, and described in detail in F. M. Gardner (pp 201-204, Phaselock Techniques, John Wiley & Sons, second edition, New York, N.Y., 1979).

The clock reference signal having a clock reference frequency (fr) is coupled to the phase-locked loop through a zero crossing detector 1012. The zero crossing detector 1012 converts the clock reference signal into a square wave. The square wave is coupled to a phase detector 1014. The write clock is generated at a frequency (N*fr) by a voltage controlled oscillator (VCO) 1016. An output signal (write clock) of the VCO 1016 is frequency divided by a frequency divider 1018. The output of the frequency divider 1018 is coupled to the phase detector 1014. The phase detector 1014 generates a phase detect signal in which the amplitude of the detect signal is proportional to the phase difference between the frequency-divided VCO signal and the square clock reference signal. Various embodiments of the phase detector exist, some of which include charge pump circuitry. The phase detect signal is amplified and filtered by a loop amplifier/filter 1020. The output of the amplifier/filter 1020 is coupled to the VCO and will advance or retard the phase of the VCO output signal.

The harmonic locking phase-locked loop accomplishes two functions. The first function is to generate a write clock which is at N times the frequency (fr) of the detected clock reference signal. The second function is to minimize the phase difference between the clock reference signal and the divided VCO signal.

While there is design flexibility in the choice of the reference multiplier N, it is not arbitrary. As noted on page 202 of Gardner; "the phase jitter at the output includes a component equal to N times that portion of the reference jitter that passes through the loop transfer function. Also, if there is closed-loop baseband noise vn at the phase detector output, then the corresponding VCO jitter is N(vn/Kd) (where Kd is the gain of the VCO), assuming that the spectrum of vn lies in the loop bandwidth. If N is large, the output jitter can be unacceptable, even for respectfully small values of reference jitter or vn. Extreme measures are sometimes needed to suppress stray circuit noises that are ordinarily negligible."

Essentially, there is a practical limitation to the size of N due to the amplification of jitter and noise in the loop. For this reason, when write clock frequency greater than the clock reference frequency is required, it is most advantageous to maximize the clock reference frequency. Therefore, N is minimized, which minimizes the jitter.

This creates a distinction between clock reference structures having fundamental frequencies significantly lower than the maximum data spatial frequency and the clock reference structure of this invention. That is, the jitter produced by clock reference structures with fundamental spatial frequencies which are significantly lower than the maximum data frequency is likely to be too great to be of practical use in writing to an optical disk unless the data is divided into sectors which include edit gaps within them. However, the clock reference structure of this invention having spatial frequencies comparable to or greater than the maximum fundamental data spatial frequency will have less jitter and noise amplification in the harmonic locking phase-locking loop than a clock reference structure having a spatial frequency less than the maximum fundamental data spatial frequency. Therefore, the clock reference structure of the invention enables the production of a superior write clock.

The data signal and the clock reference signal are both coupled to the optical transducer in both optical disk readers and optical disk writers. Therefore, the data signal and the clock reference signal must be separated. To understand the process of separating the data signal from the clock reference signal, it is important to realize that as the optical disk rotationally passes under the optical transducer at a particular velocity, spatial frequencies of structures on the recording layer of the optical disk are translated into temporal frequencies. For a given spatial frequency ($\upsilon$) on the optical disk and a given linear velocity (v) of the disk passing under the transducer, there is a specified temporal frequency (f) such that f is equal to $\upsilon$*v. Therefore, the spatial frequency relationship between the data marks and the clock reference structure is preserved as a temporal frequency relationship between the data signal and the clock reference signal.

In prior art clock generation schemes that use synchronization fields in sector headers, the separation of the data signal and the clock signal is realized by spatially alternating the data and clock signals. The separation is accomplished by only re-synchronizing the write clock during the sector headers and running the write clock open loop while the optical transducer is coupled to data fields of the optical disk. The spatial multiplexing becomes time domain multiplexing as sector headers and data fields alternately pass the optical transducer of an optical disk reader or optical disk recorder.

Spatial multiplexing as previously described, can not be used to obtain a clock reference structure which is coincident with the data structure. Rather, it is necessary that the clock reference signal be separable from the data signal while data is being read or written. Generally, there are three optical storage configurations available for accomplishing the required separation of the clock reference signal and the data signal.

Figure 13:
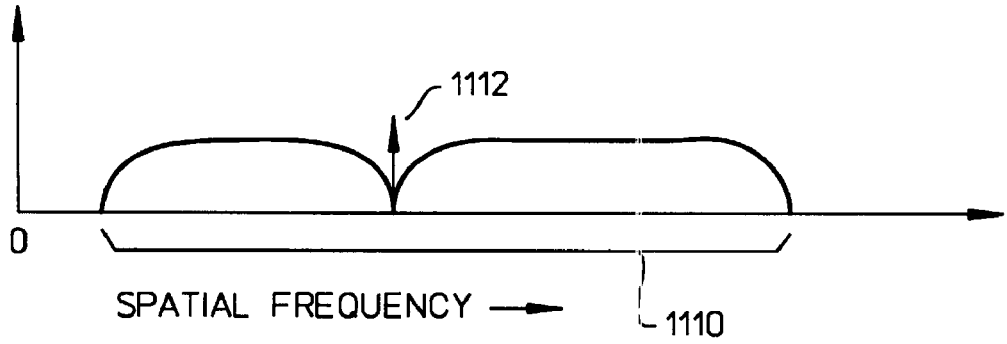
FIG. 13 shows the frequency spectrum of a prior art optical disk structure in which the clock reference structure has a spatial frequency where the spatial frequency of the data has been specifically nulled.

The first configuration includes the clock reference structure having a spatial frequency at which the spatial frequencies of the data have been specifically encoded to be nulled. FIG. 13 shows the frequency spectrum of the first configuration. That is, the data stored on the optical disk is encoded so that the data spatial frequency spectrum 1110 does not include appreciable signal power at the clock reference structure spatial frequency 1112. This is similar to the configurations described by U.S. Pat. Nos. 4,238,843, 4,363,116, 4,366,564, 4,375,088, 4,972,401. In this configuration, the data decoding is designed to ignore data frequency components which are at the clock reference frequency. The primary disadvantage of this configuration is that special coding of the data is required. The data coding required for this configuration is incompatible with several existing coding standards including the DVD-ROM standard.

Figure 14:
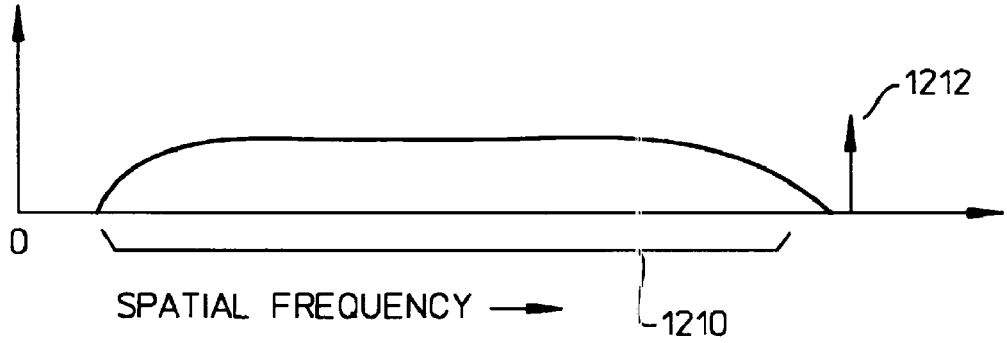
FIG. 14 shows the frequency spectrum an embodiment of the invention in which the clock reference structure has a spatial frequency which is greater than the spatial frequency spectrum of the data.
Figure 15:
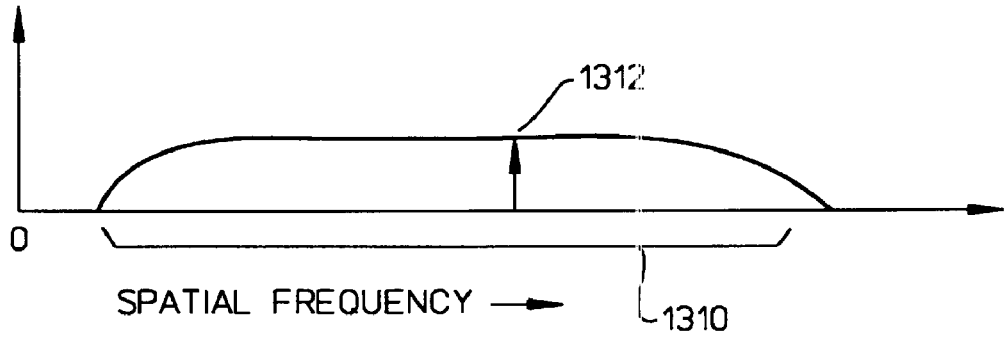
FIG. 15 shows the frequency spectrum of another embodiment of the invention in which the clock reference structure has a spatial frequency which overlaps the spatial frequency spectrum of the data.

A second configuration includes the clock reference structure having a spatial frequency which is greater than the spatial frequency of the data. FIG. 14 shows the frequency spectrum of the second configuration. The data is stored on the optical disk so that the data spatial frequency spectrum 1210 is lower than the clock reference structure spatial frequency 1212. For this configuration, an optical reader like a DVD-ROM optical reader, can not detect the spatial frequency of the clock reference structure. That is, the optical resolution of the optical disk writer is greater than the optical resolution of the optical disk reader. The optical disk writer can acquire and isolate the clock reference signal while excluding the data signal due to pre-existing data using well known signal processing techniques.

A third configuration includes the clock reference structure having a spatial frequency which overlaps the spatial frequency spectrum of the data. FIG. 13 shows the frequency spectrum of the third configuration. The data is stored on the optical disk so that the data spatial frequency spectrum 1310 overlaps the clock reference structure spatial frequency 1312.

The first configuration constrains the coding of data stored on the optical disk to an extent that this configuration can not be used for writing data to optical disks which are to be read by a DVD-ROM reader.

The second and third configurations are the subject of the invention. The second configuration offers the advantage that the clock reference frequency is greater than the clock reference frequency of the third configuration. As previously described, the greater the frequency of the clock reference signal, the lower the amount of jitter that will be added to the write clock.

The optical disk of the present invention includes construction for producing a data signal with a high signal-to-noise ratio (SNR) when read by an optical disk reader. A clock reference signal is an unwanted source of noise if it appears within the data signal of the reader. The optical and electronic specifications of the optical transducer of a standard DVD optical disk reader are defined by a DVD format specification and are well known. Further, DVD readers are publicly sold.

It is possible to determine the extent a clock reference structure formed on a re-writable DVD optical disk produces noise in the data signal of a standard DVD optical disk reader. The optical disk of the present invention includes construction for minimizing such noise.

The optical disk of the invention further includes construction to produce a high SNR clock reference signal while being recorded by an optical disk recorder of the invention. A data signal produced by pre-existing data marks on the disk is an unwanted source of noise if the data signal appears within the clock reference signal of the recorder. The optical disk recorder of the invention includes construction to maximize the clock reference signal while minimizing noise due to pre-existing data marks.

The clock reference structure of the re-writable optical disk of the invention is described by way of three embodiments. Each embodiment substantially eliminates a clock reference signal as a potential noise source in the data signal produced by a standard optical disk reader, and produces a high SNR clock reference signal in an optical disk recorder of the invention. Each of the embodiments enables the optical disk to be recorded in DVD format and subsequently re-written, in whole or in part, such that the disk is readable by a standard DVD reader.

Figure 16:
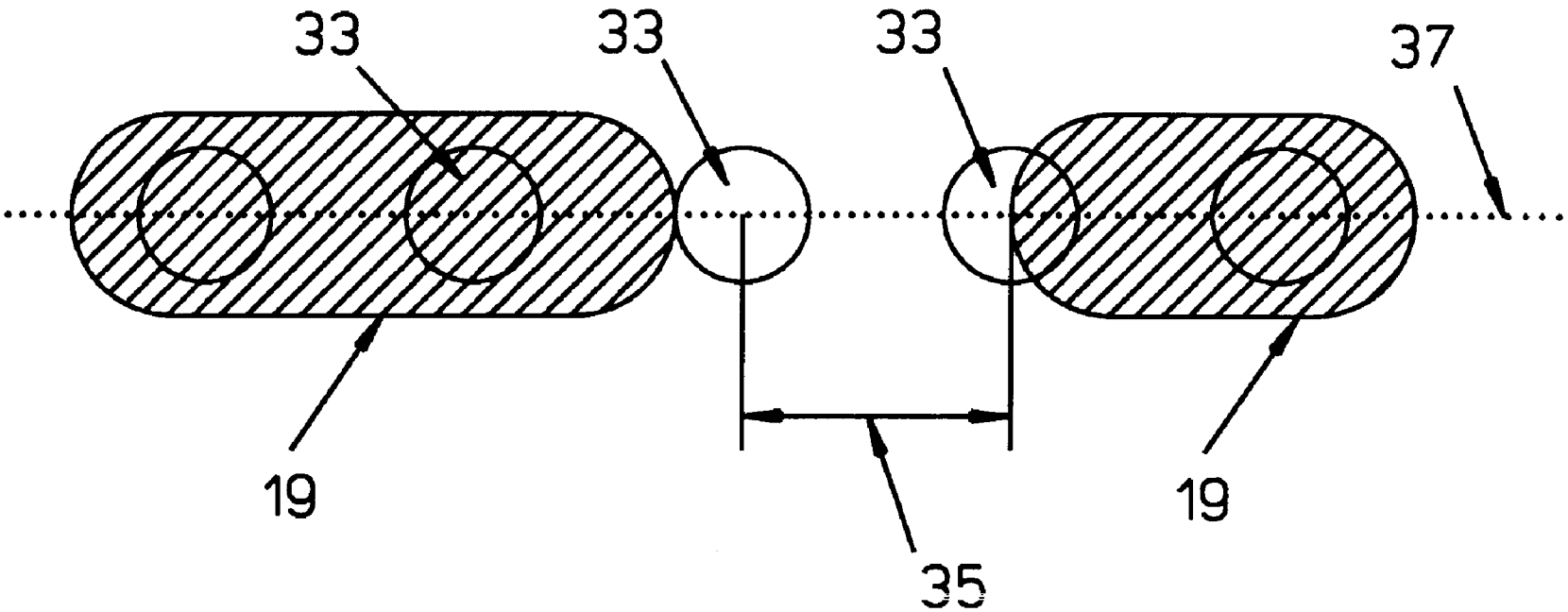
FIG. 16 shows a clock reference structure consisting of pits formed along a servo track.

FIG. 16 depicts a first embodiment clock reference structure comprising a series of clock pits 33 arranged to form a servo track having a center line 37 on the recording layer of the optical disk. The clock reference structure has a fundamental spatial frequency defined as the reciprocal of the spatial period 35 measured between the centers of adjacent clock pits. The spatial frequency of the clock reference structure is higher than the cutoff frequency of the optical transducer of a standard optical disk reader. Therefore, the clock reference signal will not appear in the data signal produced by the optical disk reader. In this embodiment, the clock pits comprising the clock reference structure also perform the functions of a servo track. Data marks 19 are recorded along the servo track.

In an optical disk recorder of the invention, the undesired data signal can be separated from the clock reference signal electronically. The frequency of the clock reference signal exceeds the highest fundamental frequency of the data signal, permitting the data signal to be substantially removed by high-pass electronic filtering. Electronic signal separation is enhanced due to the high spectral power and narrow spectral bandwidth of the clock reference signal.

Figure 17:
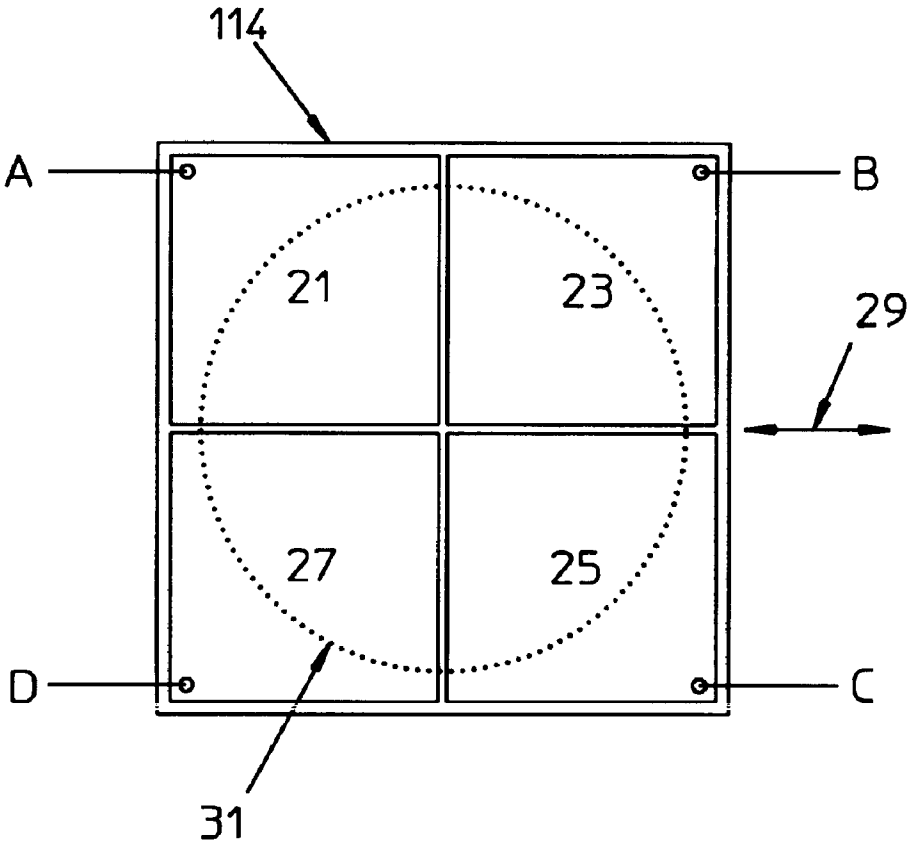
FIG. 17 shows a quadrant detector used to produce clock reference signals.

In an optical disk recorder, significant additional rejection of the data signal is obtained by detecting the clock reference signal using split detection (sometimes called tangential push-pull detection), an optical detection method well known in the art. In FIG. 10, an optical detector 114 is located substantially at a pupil of the optical transducer (an optical location sometimes referred to as "in the far field of the disk"). The lens 194 forms a pupil at detector 114 by forming an image of aperture stop 99 on detector 114. FIG. 17 shows an enlarged plan view of optical detector 114. The circular perimeter 31 shows the outer boundary of the area of detector 114 that is illuminated by beam 106 of FIG. 10. Line 29 indicates the tangential direction relative to the disk (servo tracks are parallel to the tangential direction). The detector 114 is symmetrically divided into four detection areas called quadrants. Each quadrant produces an electrical output signal which is substantially proportional to the optical power incident on that quadrant, as is well known in the art. As shown in FIG. 17, detector quadrants 21, 23, 25 and 27 produce electrical output signals A, B, C and D, respectively. A split detection signal is produced by combining the signals from the detector quadrants according to the formula ((A=D)−(B=C)), which is sometimes normalized by dividing by (A=B=C=D). The theory of optical disk readout has been extensively studied, and the characteristics of signals produced using split detection are well known for a variety of structures on the recording layer.

Split detection produces substantially no signal from the data marks produced by phase change recording wherein data marks primarily affect the amplitude of the reflected light but not its phase. (Note that the name "phase change" applies to the crystalline or amorphous phase of the recording layer, not whether the recorded marks affect the amplitude or phase of the incident light.) The clock pits which constitute the clock reference structure produce a well-modulated clock reference signal when detected using split detection in the optical transducer of the optical disk recorder. For best SNR of the clock reference signal, the preferred round trip optical depth for the pits is $\lambda/4$, where $\lambda$ is the wavelength of the light used in the optical transducer of the optical disk recorder. The optical depth of structures on the recording layer of an optical disk is defined as physical depth multiplied by the refractive index of the disk substrate material in contact with the recording layer.

Figure 18:
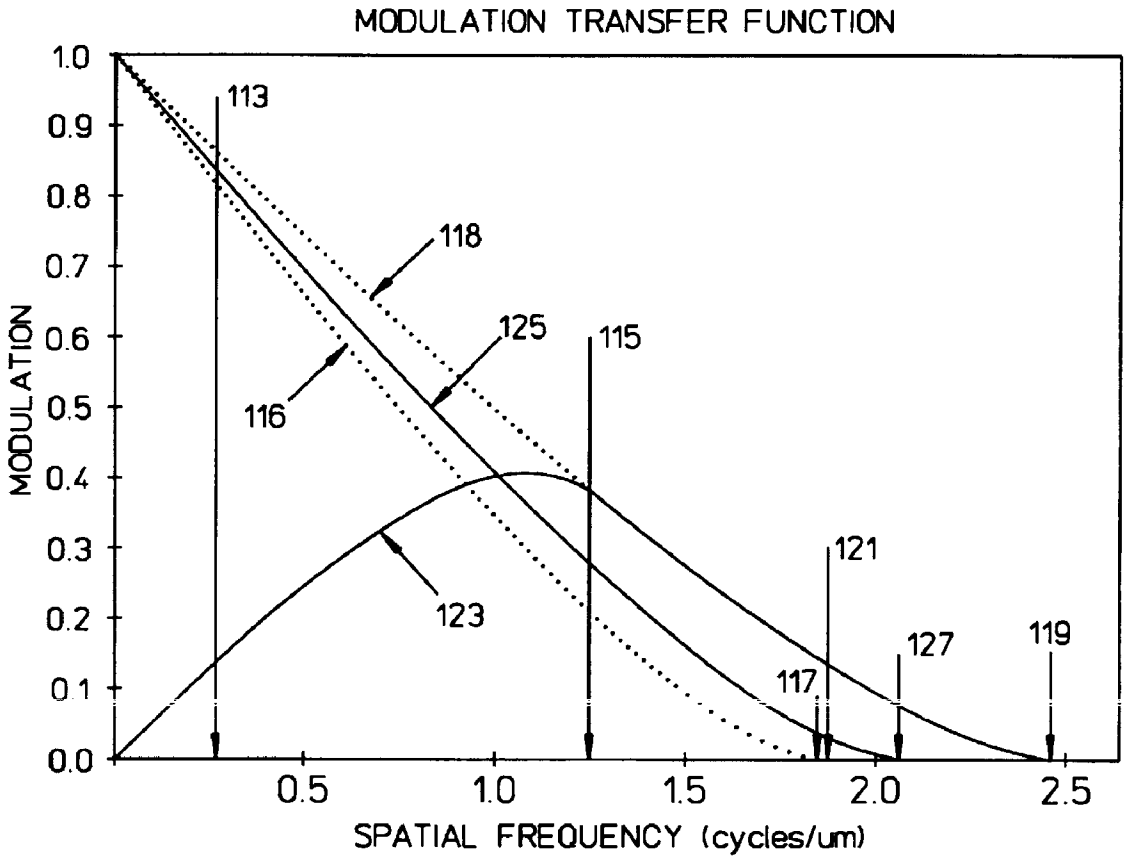
FIG. 18 shows MTF curves for split detection and push pull detection.

Referring to FIG. 18, curve 123 shows the MTF for an optical transducer which produces a clock reference signal using split detection. Split detection causes a reduction in MTF at low spatial frequencies, but does not reduce the cutoff frequency or the MTF of the optical transducer of the recorder at the clock reference structure spatial frequency 121. Split detection therefore provides a means for producing a well-modulated high-resolution clock reference signal in the recorder while writing or re-writing data on an optical disk of the invention.

Figure 19:
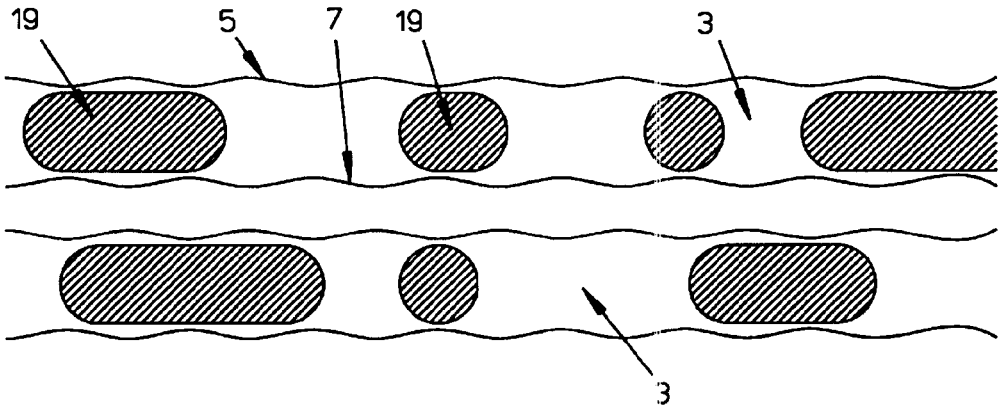
FIG. 19 shows servo tracks having a clock reference structure consisting of groove edges that oscillate substantially 180 degrees out of phase.

In a second embodiment clock reference structure, as depicted in FIG. 19, servo tracks comprise grooves 3 in the recording layer and the clock reference structure comprises edges of grooves 5, 7 which oscillate substantially 180 degrees out of phase. For best clock reference signal SNR, the preferred round-trip optical depth of the grooves is $\lambda/4$ where $\lambda$ is the wavelength of the light used in the optical transducer of the recorder. Data marks 19 are recorded along servo tracks.

A prior art standard optical disk reader generates a data signal using central aperture (CAP) detection. CAP detection is a method well known in the art which forms a signal by summing the four quadrant signals produced by a quadrant detector similar to the optical detector 114 of FIG. 17. The CAP detection signal is thus (A=B=C=D) where A, B, C, D represent the signals from the detector quadrants. Alternatively, a detector with a single detection area large enough to capture the entire beam diameter is equivalent and may be used. CAP detection is well known in the art to have low sensitivity to structures on the recording layer having a round trip optical depth of $\lambda/4$ where $\lambda$ is the wavelength of the light used in the optical transducer of the reader. This signal rejection characteristic of CAP detection permits the use of clock reference structures such as those shown in FIG. 19 with spatial frequencies below the cutoff frequency of the optical transducer of a standard optical disk reader.

In a preferred configuration, however, the spatial frequency of the clock reference structure exceeds the cutoff frequency of the optical transducer of a standard optical disk reader. In this case, the clock reference signal will be entirely eliminated from the data signal produced by the standard optical disk reader.

In an optical disk recorder, constructed to record data on disks having a reference structure comprising groove edges that oscillate substantially 180 degrees out of phase, the preferred method for detecting the clock reference signal is split detection, as previously described herein. As previously described, split detection produces substantially no signal from data marks, such as phase change marks, which primarily affect the amplitude of the reflected light. As previously noted, and as shown by curve 123 in FIG. 18, split detection maintains the full MTF and cutoff frequency of the optical transducer of the recorder at the clock reference signal spatial frequency 121, enabling a well-modulated clock reference signal to be produced.

Figure 20:
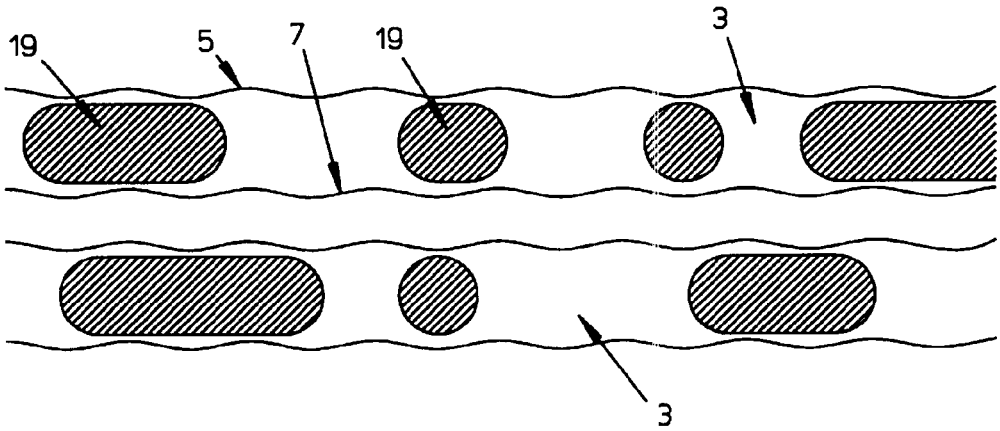
FIG. 20 shows servo tracks having a clock reference structure consisting of groove edges that oscillate in phase.

In a third embodiment clock reference structure, as depicted in FIG. 20, servo tracks comprise grooves 3 in the recording layer, the clock reference structure comprising edges 5, 7 of grooves which oscillate in phase. The preferred round-trip optical depth of the grooves is λ/4. Data marks 19 are recorded along servo tracks. As previously discussed, a standard optical disk reader uses central aperture (CAP) detection for generating a data signal. It is well known in the art of optical data storage that CAP detection substantially does not detect a signal produced by groove edges that oscillate in phase. It is also well known that CAP detection has very low sensitivity to structures having a round trip optical depth of λ/4. These two modes of signal rejection work together to enable the spatial frequency of the clock reference structure to be below the cutoff frequency of the optical transducer of a standard DVD reader without producing unacceptable levels of noise in a data signal produced by the reader.

In an optical disk recorder, constructed to record data on disks having a reference structure comprising groove edges that oscillate in phase, the preferred method for detecting the clock reference signal is radial push-pull detection, an optical method well known in the art of optical data storage. Radial push-pull detection forms a signal according to the formula ((A=B)−(C=D)), which is sometimes normalized by dividing by (A=B=C=D). As previously discussed, A, B, C and D are electrical outputs from quadrants 21, 23, 25 and 27 of detector 114 in FIG. 17. Radial push-pull detection produces substantially no signal from data marks. Data marks are not detected, first because they primarily affect the amplitude of the reflected light, and secondly because they are nominally symmetric about the center of the track. As is well known in the art, radial push-pull detection is sensitive to structures which affect the phase of the reflected light and which are asymmetric about track center. Radial push-pull detection produces a well-modulated signal from groove edges which oscillate in phase, especially when the round trip optical depth of the groove is λ/4. Radial push-pull detection produces a well-modulated signal from groove edges which oscillate in phase, especially when the round trip optical depth of the groove is λ/4. Radial push-pull detection provides sufficient rejection of the undesired data signal to permit recovery of a clock reference signal having frequency within the frequency range of the data. It is desirable to provide the ability to use a clock reference structure with a spatial frequency below the cutoff frequency of a standard optical disk reader because the radial push-pull signal detection method reduces the cutoff frequency of the recorder's optical transducer when recovering a clock reference signal. Curve 125 of FIG. 18 illustrates the MTF for an optical transducer in an optical disk recorder during detection of a clock reference structure using radial push pull detention. The cutoff frequency ($f_c$) 127 of the optical transducer of the optical disk recorder for purposes of detecting a clock reference structure is reduces from a value of 2NA/λ to a value of:

$$f_c = \sqrt{(2NA/\lambda)^2 - (1/P^2)}$$

Where the track pitch P is the radial distance between track centers. The MTF curves of FIG. 18 have been derived for the same optical transducers that are represented by MTF curves 116 and 118 of FIG. 11. Curves 116 and 118 are shown again as dotted curves in FIG. 18. In FIG. 18, the MTF of the optical transducer in an optical disk recorder is represented by curve 118. When a clock reference signal is detected using radial push pull detection, the MTF of the optical transducer is reduced. Curve 125 shows the reduced MTF. The cutoff frequency has also been reduced, from 2.46 cycles/um for curve 118 to 2.06 cycles/um for curve 125. This MTF decline associated with radial push pull detection significantly reduces the modulation of a clock reference signal having a spatial frequency above the cutoff frequency of a standard optical disk reader. For this reason, the preferred configuration of this embodiment uses a clock reference structure having a spatial frequency below the cutoff frequency of a standard optical disk reader. Note that the MTF reduction illustrated with reference to FIG. 18 applies only to the detection of the clock reference structure and does not affect the resolution of the optical transducer for the purpose of recording data.

Note that the radial push pull signal contains tracking error information at frequencies substantially below the clock reference signal frequency and may also be used generate a tracking error signal for use by a tracking positioner.

The invention can include other clock reference structures such as a clock reference structure which consists of a groove having a single edge which oscillates. The three clock reference structures described here are by way of example.

Figure 21:
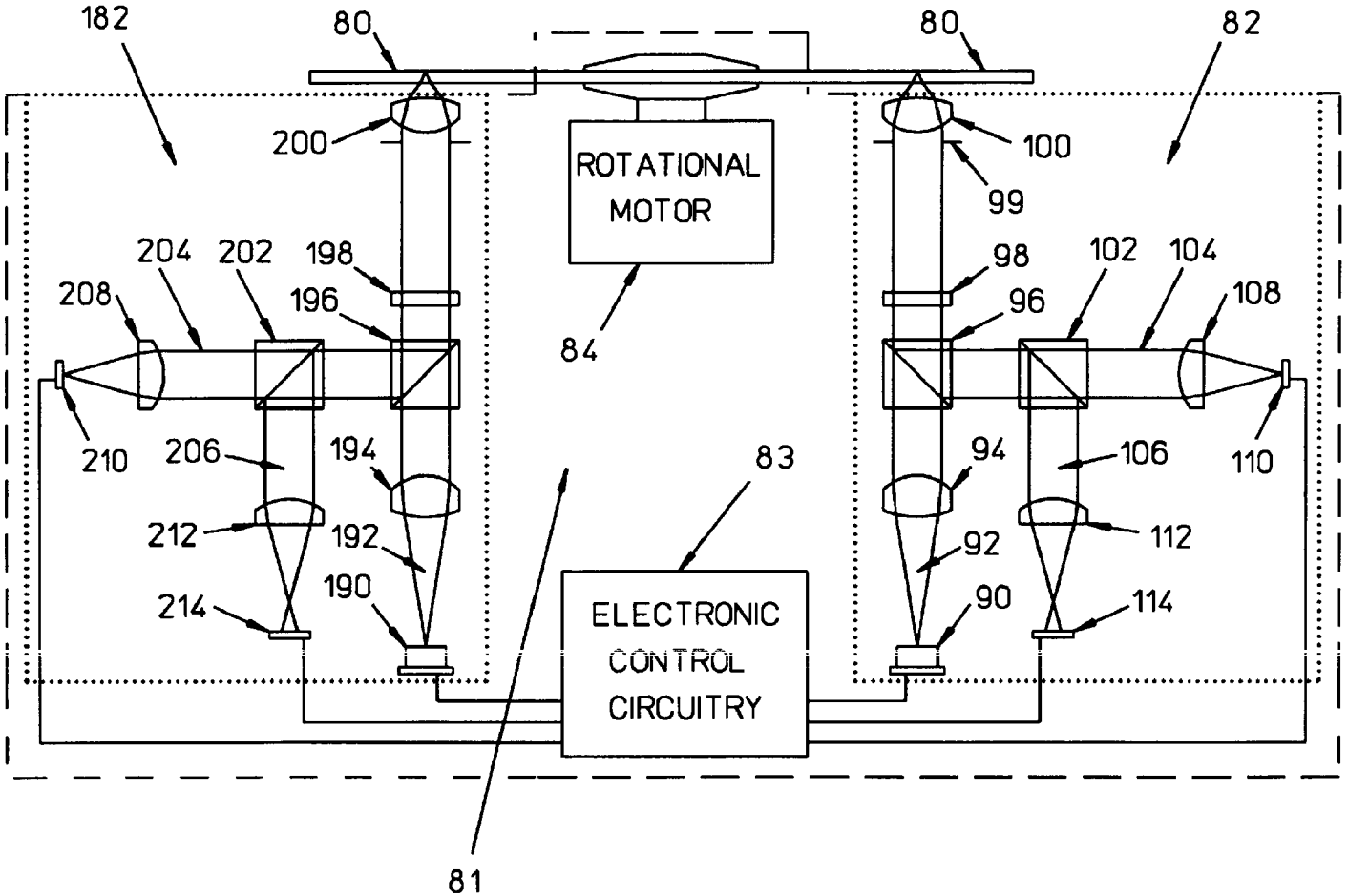
FIG. 21 shows an embodiment of the invention having a second optical transducer for reading data.

FIG. 21 shows another embodiment of the optical disk recorder of the invention which includes a second optical transducer 182 for reading data stored on an optical disk 80. The optical disk recorder 81 has a first optical transducer 82 and a second optical transducer 182 which are optically coupled to the recording layer of the optical disk 80. The first optical transducer 82 is used for recording data and operates as previously described with reference to FIG. 10. The second optical transducer 182 follows a servo track as the optical disk 80 rotates. The data marks cause the second optical transducer 182 to produce a data signal as the optical disk 80 rotates. The second optical transducer 182 includes several optical devices and has many similarities with optical transducer 82. A laser 190 emits a linearly polarized beam of light 192 which is collimated by a collimator lens 194. The light beam 192 passes through a polarization beam splitter 196. The light beam 192 is converted from linear polarization to circular polarization by a quarter wave retardation plate 198. The light beam 192 is focused by an objective lens 200 onto the recording layer of the optical disk 80 containing recorded data marks. A portion of the light beam 192 is reflected by the optical disk 80 and returns through the objective lens 200 and the quarter wave plate 198. Upon passing back through the quarter wave retardation plate 198, the light beam 192 is again linearly polarized. However the polarization direction of the light beam 192 is rotated 90 degrees relative to its initial orientation. Therefore, the polarization beam splitter 196 reflects substantially all of light beam 192 towards beam splitter 202. The beam splitter 2020 splits the beam 192 into a first light beam 204 and a second light beam 206. The first light beam 204 is collected by a first light beam 204 and a second light beam 206. The first light beam 204 is collected by a first lens 208 onto a first detector 210 which is arranged to produce a focus-error signal. The second light beam 206 is collected by a second lens 212 onto a second detector 214 which is arranged to produce a data signal. The second detector 214 also produces a tracking-error signal used by a tracking positioner. Detectors 210 and 214 generally include multiple detection areas and produce multiple detection signals as is well known in the art. Many alternative arrangements of the optical components and detectors are possible, including arrangements which combine or eliminate optical components shown in FIG. 21.

Figure 22:
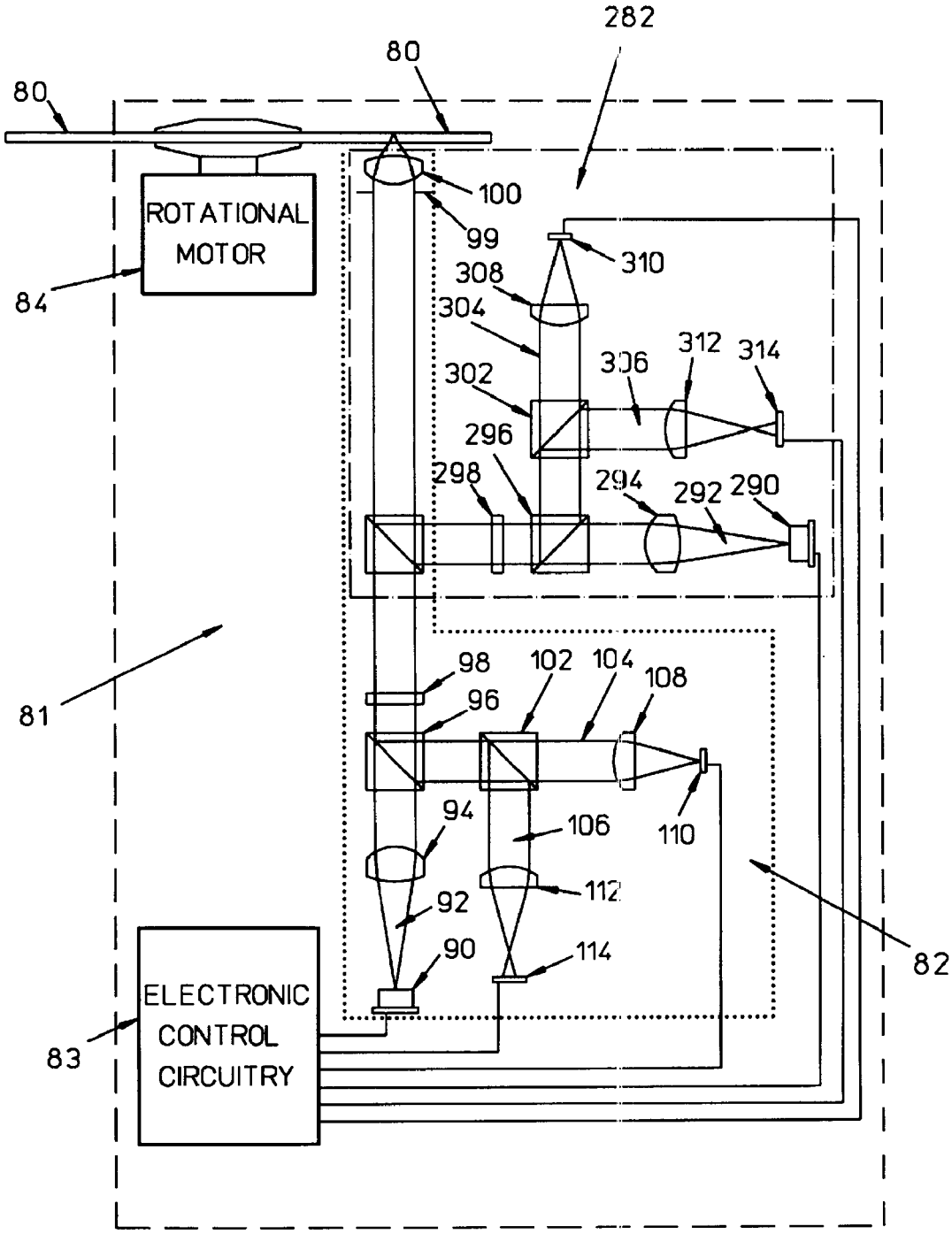
FIG. 22 shows an embodiment of the invention having another configuration of a second optical transducer which shares a combination objective lens with a first optical transducer.

FIG. 22 illustrates another embodiment of the optical disk recorder of the invention. This embodiment includes another configuration of a second optical transducer 282 for reading data stored on an optical disk 80 and uses the same objective lens 100 as optical transducer 82 which is used for recording data. The shared objective lens is referred to as a combination objective lens 100. FIG. 22 shows the optical disk recorder 81 in which the second optical transducer 282 is optically coupled to data marks on the recording layer of optical disk 80. The second optical transducer follows a servo track as the optical disk rotates. The data marks cause the second optical transducer to produce a data signal s the optical disk rotates. As illustrated in FIG. 22, the second optical transducer 282 includes several optical devices and has many similarities with optical transducer 82. A laser 290 emits a linearly polarized beam of light 292 which is collimated by a collimator lens 294. The light beam 292 passes through a polarization beam splitter 296. The light beam 292 is converted from linear polarization to circular polarization by a quarter wave retardation plate 298. The light beam 292 then passes through an aperture stop 99 and is focused by an objective lens 100 onto the recording layer of the optical disk 80 containing recorded data marks. A portion of the light beam 292 is reflected by the optical disk 80 and returns through the objective lens 100 and the quarter wave plate 298. Upon passing back through the quarter wave retardation plate 298, the light beam 292 is again linearly polarized. However the polarization direction of the light beam 292 is rotated 90 degrees relative to its initial orientation. Therefore, the polarization beam splitter 296 reflects substantially all of light beam 292 towards beam splitter 302. The beam splitter 302 splits the beam 292 into a first light beam 304 and a second light beam 306. The first light beam 304 is collected by a first lens 308 onto a first detector 310 which is arranged to produce a focus-error signal. The second light beam 306 is collected by a second lens 312 onto a second detector 314 which is arranged to produce a tracking-error signal used by the tracking positioner, and a data signal containing information encoded in data marks on optical disk 80. Detectors 310 and 314 generally include multiple detection areas and produce multiple detection signals as is well known in the art. Many alternative arrangements of the optical components and detectors are possible, including arrangements which combine or eliminate optical components shown in FIG. 22. The laser 290 emits light at a longer wavelength than the laser 90. The beam splitter 296 is a wavelength sensitive beam splitter (sometimes called a dichroic beam splitter) which transmits light of a first wavelength and reflects light of a second wavelength. The shorter wavelength laser 90 of optical transducer 82 provides a smaller focused spot of light and a correspondingly higher MTF and cutoff frequency for recording data marks and producing a clock reference signal. The longer wavelength laser 292 of second optical transducer 282 provides a larger focused spot and a correspondingly lower MTF and cutoff frequency for reading data marks.

Another embodiment of the invention uses a variation of the components shown in FIG. 10 and previously described. As shown in FIG. 10, an optical transducer 82 performs the functions of both an optical disk recorder and an optical disk reader. When used as an optical disk recorder, the components of the optical transducer 82 perform as previously described with reference to FIG. 10. When used as an optical disk reader, the optical transducer 82 is optically coupled to data marks on the recording layer of optical disk 80. The optical transducer 82 follows a servo track as the optical disk 80 rotates. The data marks cause the optical transducer 82 to produce a data signal as the optical disk 80 rotates. The laser 90 emits a linearly polarized beam of light 92 which is collimated by a collimator lens 94. The light beam 92 passes through a polarization beam splitter 96. The light beam 92 is converted from linear polarization to circular polarization by a quarter wave retardation plate 98. The light beam 92 then passes through an aperture stop 99. The aperture stop 99 is dynamically controlled to be smaller when the optical transducer 82 is used as an optical disk reader and larger when the optical transducer 82 is used as an optical disk recorder. When the diameter of the aperture stop 99 is reduced, the effective numerical aperture of objective lens 100 is reduced. The light beam 92 passes through the objective lens 100 and onto the recording layer of the optical disk 80 containing recorded data marks. The MTF and the cutoff frequency of optical transducer 82 are reduced when the diameter of aperture stop 99 is reduced and a data signal is produced that does not contain unwanted noise produced by a clock reference structure formed on the recording layer of the optical disk 80. A portion of the light beam 92 is reflected by the optical disk 80 and returns through the objective lens 100 and the quarter wave plate 98. Upon passing back through the quarter wave retardation plate 98, the light beam 92 is again linearly polarized. However, the polarization direction of the light beam 92 is rotated 90 degrees relative to its initial orientation. Therefore, the polarization beam splitter 96 reflects substantially all of light beam 92 towards beam splitter 102. The beam splitter 102 splits the beam 92 into a first light beam 104 and a second light beam 106. The first light beam 104 is collected by a first lens 108 onto a first detector 110 which is arranged to produce a focus-error signal. The second light beam 106 is collected by a second lens 112 onto a second detector 114 which is arranged to produce a tracking-error signal used by the tracking positioner. During data detection, detector 114 is also arranged to produce a data signal containing information encoded in data marks on optical disk 80. Detectors 110 and 114 generally include multiple detection areas and produce multiple detection signals as is well known in the art. Many alternative arrangements of the optical components and detectors are possible, including arrangements which combine or eliminate optical components shown in FIG. 10. When adjusted to a higher effective numerical aperture for recording data, the optical transducer 82 provides a smaller focused spot of light and a correspondingly higher MTF and cutoff frequency necessary for recording data marks and producing a clock reference signal. When adjusted to a lower effective numerical aperture, the optical transducer 82 provides a larger focused spot and a correspondingly lower MTF and cutoff frequency necessary for reading data marks.

Although specific embodiments of the invention have been described and illustrated, the invention is not to be limited to the specific forms or arrangements of parts so described and illustrated. The invention is limited only by the claims.

What is claimed:

[1. An optical disk comprising;

a recording layer having servo tracks; and a clock reference structure formed along the servo tracks, the clock reference structure permitting data marks to be written and re-written to the recording layer in data fields of indeterminate length, the reference clock structure permitting the generation of a clock reference signal which controls where first and second transition edges of data marks are written to the recording layer with sub-hit accuracy.]

[2. The optical disk as recited in claim 1, wherein the clock reference structure comprises a reference spatial frequency which is greater than a predetermined spatial frequency.]

[3. The optical disk as recited in claim 2, wherein the predetermined spatial frequency is the maximum spatial frequency detectable by a standard DVD-ROM reader.]

[4. The optical disk as recited in claim 2, wherein the clock reference structure comprises edges of grooves of the servo tracks which oscillate in-phase at an oscillation spatial frequency, the oscillation spatial frequency corresponding to the reference spatial frequency.]

[5. The optical disk as recited in claim 2, wherein the clock reference structure comprises edges of grooves of the servo tracks which oscillate substantially 180 degrees out-of-phase at an oscillation spatial frequency, the oscillation spatial frequency corresponding to the reference spatial frequency.]

[6. The optical disk as recited in claim 2, wherein the clock reference structure comprises pits formed along the servo tracks, the reciprocal of a distance between centers of adjacent pits corresponding to the reference spatial frequency.]

[7. The optical disk as recited in claim 1, wherein a first optical transducer coupled to the clock reference structure generates a clock reference signal comprising a clock reference signal frequency.]

[8. The optical disk as recited in claim 7, wherein the first optical transducer coupled to data marks on the recording layer generates a data signal having a frequency spectrum in which all fundamental frequency components of the frequency spectrum are less than the clock reference signal frequency.]

[9. The optical disk as recited in claim 8, wherein a standard DVD-ROM reader can read the data marks but cannot detect the clock reference structure.]

[10. An optical disk recorder comprising:

an optical disk rotatably mounted on the recorder, the optical disk having a recording layer containing servo tracks;

a first optical transducer optically coupled to the recording layer of the optical disk, the first optical transducer following a servo track as the optical disk rotates;

a clock reference structure formed along the servo tracks providing data fields of indeterminate length, the clock reference structure causing the first optical transducer to produce a clock reference signal as the optical disk rotates;

means for recording data marks on the recording layer of the optical disk, wherein the data marks are recorded to include fundamental spatial frequencies less than a predetermined spatial frequency; and a write clock which determines the placement of first and second transition edges of data marks on the recording layer of the optical disk with sub-bit accuracy, the write clock being phase locked to the clock reference signal.]

[11. The optical disk recorder as recited in claim 10, wherein the predetermined spatial frequency is the greatest spatial frequency detectable by a standard DVD-ROM reader.]

[12. The optical disk recorder as recited in claim 10, wherein the servo tracks include grooves and the clock reference structure comprises edges of the grooves which oscillate in-phase.]

[13. The optical disk recorder as recited in claim 12, wherein data marks cause the first optical transducer to produce an unwanted data signal as the optical disk rotates, and the clock reference signal is separated from the unwanted data signal by detecting the clock reference signal using radial push-pull detection.]

[14. The optical disk recorder recited in claim 10, wherein the servo tracks include grooves and the clock reference structure comprises edges on the grooves which oscillate substantially 180 degrees out-of-phase.]

[15. The optical disk recorder recited in claim 14, wherein data marks cause the first optical transducer to produce and unwanted data signal as the optical disk rotates, and the clock reference signal is separated from the unwanted data signal by detecting the clock reference signal using split detection.]

[16. The optical disk recorder recited in claim 10, wherein the clock reference structure comprises pits formed along the servo tracks.]

[17. The optical disk recorder as recited in claim 10, wherein the data marks are positioned along the servo tracks according to a DVD-ROM standard.]

[18. The optical disk recorder as recited in claim 10, wherein the data marks are arbitrarily coded.]

[19. The optical disk recorder as recited in claim 10, further comprising a second optical transducer which is optically coupled to the data marks on the recording layer, the second optical transducer following a servo track as the optical disk rotates, the data marks causing the second optical transducer to produce a data signal as the optical disk rotates.]

[20. The optical disk recorder as recited in claim 19, wherein the first optical transducer comprises a first laser and a first objective lens and the second transducer comprises a second laser and a second objective lens.]

[21. The optical disk recorder as recited in claim 20, wherein a combination objective lens is both the first objective lens and the second objective lens.]

[22. The optical disk recorder as recited in claim 20, wherein a numerical aperture of the combination objective lens is adjustably controlled to be lower when reading data than when recording data.]

[23. The optical disk recorder as recited in claim 20, wherein a wavelength of the second laser is greater than a wavelength of the first laser.]

[24. An optical disk recorder for receiving an optical disk which is rotatably mountable on the recorder, the optical disk comprising a recording layer having servo tracks and a clock reference structure having a spatial frequency which is greater than a predetermined spatial frequency, the clock reference structure being formed along the servo tracks and providing data fields of indeterminate length, the optical disk recorder comprising:

a first optical transducer which can optically couple to a recording layer of the optical disk, the first optical transducer following the servo tracks as the optical disk rotates, the clock reference structure causing the first optical transducer to produce a clock reference signal as the optical disk rotates;

means for writing data marks on the recording layer of the optical disk; and a write clock which determines the physical placement of first and second transition edges of data marks written on the recording layer of the optical disk with sub-bit accuracy, the write clock being phase locked to the clock reference signal.]

[25. The optical disk recorder as recited in claim 24, wherein the predetermined spatial frequency is the maximum spatial frequency detectable by a standard DVD-ROM reader.]

[26. The optical disk recorder as recited in claim 24, wherein the first optical transducer can detect higher spatial frequencies that an optical transducer of a standard DVD-ROM optical disk reader.]

[27. The optical disk recorder as recited in claim 24, further comprising a second optical transducer which can optically couple to the data marks on the recording layer, the second optical transducer following a servo track as the optical disk rotates, the data marks causing the second optical transducer to produce a data signal as the optical disk rotates.]

[28. The optical disk recorder as recited in claim 24, wherein the first optical transducer comprises a first laser and a first objective lens and the second transducer comprises a second laser and a second objective lens.]

[29. The optical disk recorder as recited in claim 28, wherein a combination objective lens is both the first objective lens and the second objective lens and the objective lens.]

[30. The optical disk recorder as recited in claim 29, wherein a numerical aperture of the combination objective lens is adjustably controlled to be lower when reading data than when recording data.]

[31. The optical disk recorder as recited in claim 29, wherein a wavelength of the second laser is greater than a wavelength of the first laser.]

[32. The optical disk as recited in claim 7, wherein the first optical transducer coupled to data marks on the recording layer generates a data signal having a frequency spectrum in which the clock reference signal frequency is within fundamental frequency components of the frequency spectrum.]

[33. The optical disk as recited in claim 32, further including means for optically separating the data from the clock reference signal.]

[34. The optical disk as recited in claim 32, further including means for optically separating the clock reference signal the form the data signal.]

[35. An optical disk comprising;

a recording layer having servo tracks;

a clock reference structure formed along the servo tracks, the clock reference structure permitting data marks to be written and re-written to the recording layer in data fields of indeterminate length, the reference clock structure permitting the generation of a clock reference signal which controls where first and second transition edges of data marks are written to the recording layer with sub-bit accuracy;

a first optical transducer coupled to the clock reference structure generating a clock reference signal comprising a clock reference signal frequency; and wherein the first optical transducer coupled to data marks on the recording layer generates a data signal having a frequency spectrum in which the clock reference signal frequency is within fundamental frequency components of the frequency spectrum.]

[36. An optical disk recorder comprising:

an optical disk rotatably mounted on the recorder, the optical disk having a recording layer containing servo tracks, the servo tracks comprising grooves;

a first optical transducer optically coupled to the recording layer of the optical disk, the first optical transducer following a servo as the optical disk rotates;

a clock reference structure comprising edges of the grooves which oscillate in-phase formed along the servo tracks, the clock reference structure providing data fields of indeterminate length, the clock reference structure causing the first optical transducer to produce a clock reference signal as the optical disk rotates;

means for recording data marks on the recording layer of the optical disk, wherein the data marks are recorded to include fundamental spatial frequencies less than a predetermined spatial frequency;

a write clock which determines the placement of data marks on the recording layer of the optical disk, the write clock being phase locked to the clock reference signal; and wherein data marks cause the first optical transducer to produce an unwanted data signal as the optical disk rotates, and the clock reference signal is separated from the unwanted data signal by detecting the clock reference signal using radial push-pull detection.]

[37. An optical disk recorder comprising:

an optical disk rotatably mounted on the recorder, the optical disk having a recording layer containing servo tracks, the servo tracks comprising grooves;

a first optical transducer optically coupled to the recording layer of the optical disk, the first optical transducer following a servo track as the optical disk rotates;

a clock reference structure comprising edges on the grooves which oscillate substantially 180 degrees out-of-phase formed along the servo tracks, the clock reference structure providing data fields of indeterminate length, the clock reference structure causing the first optical transducer to produce a clock reference signal as the optical disk rotates;

means for recording data marks on the recording layer of the optical disk, wherein the data marks are recorded to include fundamental spatial frequencies less than a predetermined spatial frequency;

a write clock which determines the placement of data marks on the recording layer of the optical disk, the write clock being phase locked to the clock reference signal; and wherein data marks cause the first optical transducer to produce an unwanted data signal as the optical disk rotates, and the clock reference signal is separated from the unwanted data signal by detecting the clock reference signal using split detection.]

*38. A system, comprising:*

*an optical disk rotatably mounted on an optical disk recorder, the optical disk having a recording layer residing in at least one servo track;*

*a first optical transducer optically coupled to the recording layer of the optical disk, the first optical transducer following the servo track as the optical disk rotates;*

*a high spatial frequency clock reference structure formed along the servo track, the high spatial frequency clock reference structure causing the first optical transducer to produce a clock reference signal as the optical disk rotates;*

*a means for recording data on the recording layer of the optical disk; and*

*a write clock corresponding to the clock reference signal and used to determine placement of a first transition edge of a data mark and a second transition edge of the data mark.*

*39. The system of claim 38, wherein the write clock is phase locked to the clock reference signal.*

*40. The system of claim 38, further comprising at least one data field of indeterminate length written on the recording layer.*

*41. The system of claim 40, wherein a previously presented data mark is re-written onto the data field.*

*42. The system of claim 40, wherein the data mark is written onto the data field without an edit gap.*

*43. The system of claim 38, further comprising a plurality of data marks written without edit gaps.*

*44. The system of claim 38, further comprising a plurality of data marks written without a synch field.*

*45. The system of claim 38, further comprising a plurality of data marks written without an address field.*

*46. The system of claim 38, further comprising a plurality of data marks written without a servo field.*

*47. The system of claim 38, further comprising track address information within the clock reference structure.*

*48. The system of claim 38, wherein the write clock functions at a frequency which is greater than the frequency of the clock reference signal.*

*49. An optical disk recorder configured to receive an optical disk which is rotatably mountable on the recorder, the optical disk comprising a recording layer having a servo track and a high spatial frequency clock reference structure formed along the servo track enabling generation of a clock reference signal such that data is written onto the recording layer without edit gaps, the optical disk recorder comprising:*

*a first optical transducer which can optically couple to the recording layer of the optical disk, the first optical transducer following the servo tracks as the optical disk rotates, the clock reference structure causing the first optical transducer to produce the clock reference signal as the optical disk rotates;*

*means for writing data marks on the recording layer of the optical disk without edit gaps; and*

*a write clock which determines physical placement of first and second transition edges of data marks written on the recording layer of the optical disk by the means for writing data marks, the write clock being phase locked to the clock reference signal.*

*50. The optical disk recorder as recited in claim 49, wherein the clock reference signal controls where the first and second transition edges of the data marks are written to the recording layer with sub-bit accuracy.*

*51. The optical disk recorder as recited in claim 49, wherein a spatial frequency of the high spatial frequency clock reference structure is within a spatial frequency spectrum of the data marks.*

*52. The optical disk recorder as recited in claim 49, further comprising a second optical transducer which can optically couple to the data marks on the recording layer, the second optical transducer following the servo track as the optical disk rotates, the data marks causing the second optical transducer to produce a data signal as the optical disk rotates.*

*53. The optical disk recorder as recited in claim 49, wherein the means for writing data marks on the recording layer writes data marks on the recording layer as a re-writing of withdrawn data marks over existing data marks.*

*54. A method comprising:*

*detecting a servo track on an optical disk, the servo track comprising a recording layer and a high spatial frequency clock reference structure formed thereon;*

*generating a clock reference signal from the high spatial frequency clock reference structure; and*

*writing data marks having data fields of indeterminate length on the recording layer without edit gaps based upon the generated clock reference signal.*

*55. The method of claim 54, wherein the detecting further comprises detecting oscillation of edges of grooves of the servo track which oscillate at an oscillation spatial frequency, the oscillation spatial frequency detectable thereby enabling generation of the clock reference signal.*

*56. The method as recited in claim 54, wherein writing data marks on the recording layer further comprises writing data marks having first and second transition edges written with sub-bit accuracy.*

*57. The method as recited in claim 54, wherein the spatial frequency of the high spatial frequency clock reference structure is within a spatial frequency spectrum of the data marks.*

*58. The method as recited in claim 54, wherein writing data marks on the recording layer further comprises writing data marks on the recording layer as a re-writing of withdrawn data marks over existing data marks.*

*59. An optical disk recorder configured to receive an optical disk which is rotatably mountable on the recorder, the optical disk comprising a recording layer having a servo track and a plurality of clock pits separated from each other by a spatial period, a reciprocal of the spatial period corresponding to a high spatial frequency clock reference structure enabling generation of a clock reference signal such that data is written onto the recording layer without edit gaps, the optical disk recorder comprising:*

*a first optical transducer that can optically couple to the optical disk, the first optical transducer following the servo tracks as the optical disk rotates and detecting the plurality of clock pits such that the spatial frequency associated with the plurality of clock pits causes the first optical transducer to produce the clock reference signal as the optical disk rotates;*

*a laser that writes at least data marks on the recording layer of the optical disk without edit gaps; and*

*a write clock that determines physical placement of first and second transition edges of data marks written on the recording layer of the optical disk by the laser, the write clock being phase locked to the clock reference signal.*

*60. The optical disk recorder as recited in claim 59, wherein the clock reference signal controls where the first and second transition edges of the data marks are written to the recording layer with sub-bit accuracy.*

*61. The optical disk recorder as recited in claim 59, wherein a spatial frequency of the high spatial frequency clock reference structure is within a spatial frequency spectrum of the data marks.*

*62. The optical disk recorder as recited in claim 59, further comprising a second optical transducer which can optically couple to the data marks on the recording layer, the second optical transducer following the servo track as the optical disk rotates, the data marks causing the second optical transducer to produce a data signal as the optical disk rotates.*

*63. The optical disk recorder as recited in claim 59, wherein the laser writes data marks on the recording layer as a re-writing of withdrawn data marks over existing data marks.*

*64. A method comprising:*

*detecting a servo track on an optical disk, the servo track comprising a recording layer and a plurality of clock pits separated from each other by a spatial period, a reciprocal of the spatial period corresponding to a high spatial frequency clock reference structure;*

*generating a clock reference signal from the high spatial frequency clock reference structure; and*

*writing data marks having data fields of indeterminate length on the recording layer without edit gaps based upon the generated clock reference signal.*

*65. The method as recited in claim 64, wherein writing data marks on the recording layer further comprises writing data marks having first and second transition edges written with sub-bit accuracy.*

*66. The method as recited in claim 64, wherein the spatial frequency of the high spatial frequency clock reference structure is within a spatial frequency spectrum of the data marks.*

*67. The method as recited in claim 64, wherein writing data marks on the recording layer further comprises writing data marks on the recording layer as a re-writing of withdrawn data marks over existing data marks.*

* * * * *

UNITED STATES PATENT AND TRADEMARK OFFICE

CERTIFICATE OF CORRECTION

PATENT NO. : RE43,788 E
APPLICATION NO. : 12/725099
DATED : November 6, 2012
INVENTOR(S) : Daniel Y. Abramovitch et al.

It is certified that error appears in the above-identified patent and that said Letters Patent is hereby corrected as shown below:

In the Specifications:

In column 1, line 42, delete “stat” and insert -- data --, therefor.

Figure 2A:
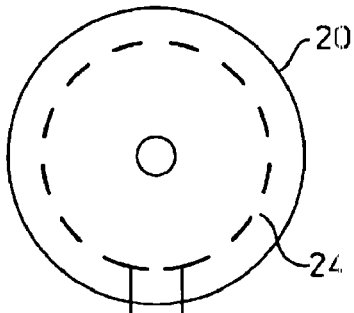
Figure 2a (PRIOR ART)
FIG. 2a shows a plan-view of a prior art re-writable optical disk.
Figure 2B:
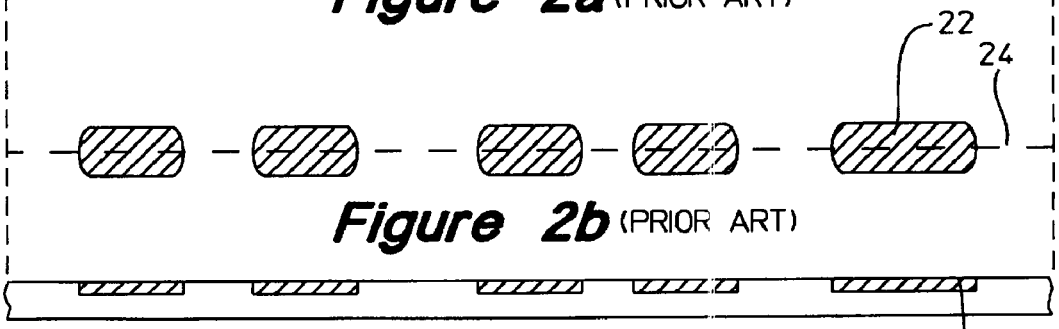
Figure 2b (PRIOR ART)
Figure 2C:
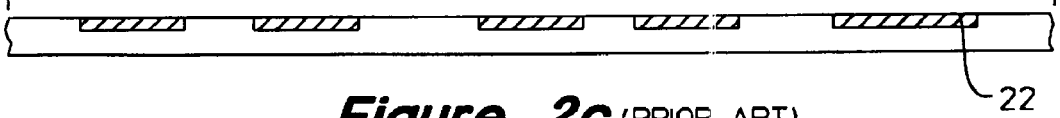
Figure 2c (PRIOR ART)
FIG. 2c shows a cross-sectional view of the track shown in FIG. 2b.
Figure 3A:
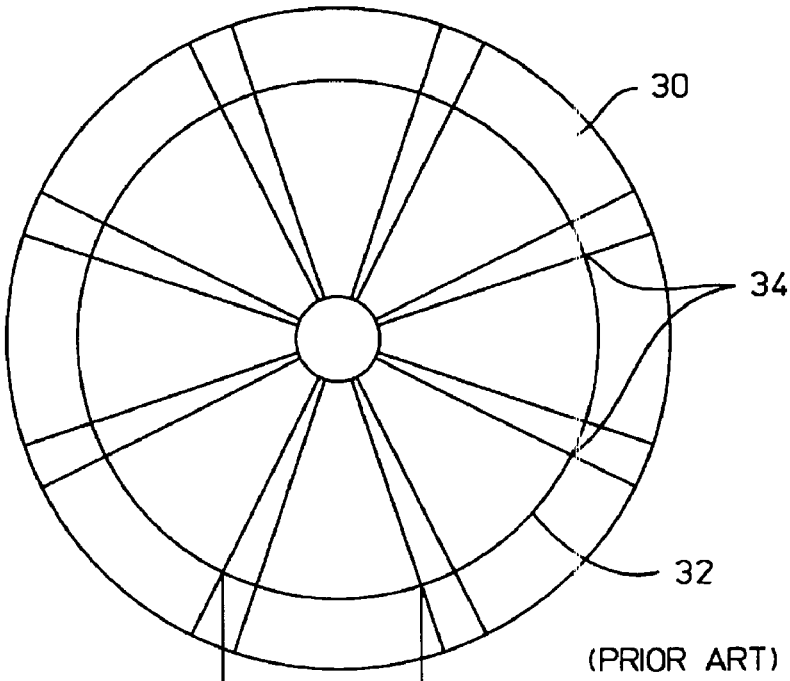
(PRIOR ART) Figure 3a
FIG. 3a shows a plan-view of a prior art optical disk 30 in which data stored along a servo track 32 is divided into sectors 34.
Figure 3B:
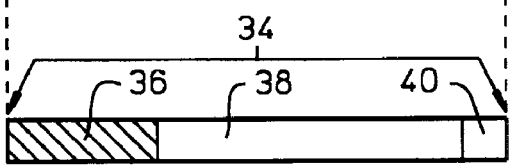
Figure 3b (PRIOR ART)
Figure 3C:
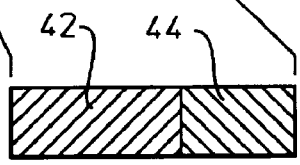
Figure 3c (PRIOR ART)
FIG. 3c shows an expanded view of the header 36 shown in FIG. 3b.

In column 2, line 27, delete “FIG. 20a” and insert -- FIG. 2a --, therefor.

In column 4, line 3, delete “write” and insert -- write using --, therefor.

In column 4, line 4, below “formats.” insert -- SUMMARY OF THE INVENTION --.

In column 4, line 6, delete “structure” and insert -- structure formed continuously along servo tracks on the recording layer. The clock reference structure --, therefor.

In column 4, line 30, delete “An” and insert -- An optical transducer is optically coupled to the recording layer of the optical disk. The --, therefor.

In column 4, line 58, delete “transducer” and insert -- transducer to produce a clock reference signal as the optical disk rotates. The optical disk recorder --, therefor.

In column 7, line 40, delete “invention,” and insert -- invention, synchronization information may still be included within data fields. This --, therefor.

In column 8, lines 61-62, delete “in-phase” and insert -- in-phase by --, therefor.

In column 11, line 51, delete “optical” and insert -- optical disk --, therefor.

In column 12, line 66, delete “square” and insert -- square wave --, therefor.

In column 13, line 25, delete “when” and insert -- when a --, therefor.

Signed and Sealed this
Thirtieth Day of April, 2013

Teresa Stanek Rea
*Acting Director of the United States Patent and Trademark Office*

In column 13, line 41, delete “phase-locking” and insert -- phase-locked --, therefor.

In column 15, line 54, delete “194” and insert -- 94 --, therefor.

In column 16, lines 1-2, delete “((A=D)-(B=C)),” and insert -- ((A+D)-(B+C)), --, therefor.

In column 16, line 3, delete “(A=B=C=D).” and insert -- (A+B+C+D). --, therefor.

In column 16, line 47, delete “(A=B=C=D)” and insert -- (A+B+C+D) --, therefor.

In column 17, line 37, delete “((A=D)-(B=C)),” and insert -- ((A+D)-(B+C)), --, therefor.

In column 17, line 38, delete “(A=B=C=D).” and insert -- (A+B+C+D). --, therefor.

In column 17, lines 50-53, after “λ/4.” delete “Radial push-pull detection produces a well-modulated signal from groove edges which oscillate in phase, especially when the round trip optical depth of the groove is λ/4.”.

In column 17, line 55, delete “having” and insert -- having a --, therefor.

In column 17, line 64, delete “detention.” and insert -- detection. --, therefor.

In column 17, line 66, delete “reduces” and insert -- reduced --, therefor.

In column 18, line 63, delete “2020” and insert -- 202 --, therefor.

In column 18, lines 64-66, after “beam 206.” delete “The first light beam 204 is collected by a first light beam 204 and a second light beam 206.”.